United States Patent
Furuya

(10) Patent No.: US 8,379,253 B2
(45) Date of Patent: Feb. 19, 2013

(54) STRUCTURED DOCUMENT CONVERSION APPARATUS, STRUCTURED DOCUMENT CONVERSION METHOD, AND STORAGE MEDIUM

(75) Inventor: Tomoyuki Furuya, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 950 days.

(21) Appl. No.: 12/427,631

(22) Filed: Apr. 21, 2009

(65) Prior Publication Data
US 2009/0262396 A1 Oct. 22, 2009

(30) Foreign Application Priority Data
Apr. 22, 2008 (JP) .................. 2008-111771

(51) Int. Cl.
G06F 3/12 (2006.01)
G06F 15/00 (2006.01)
(52) U.S. Cl. ...................... 358/1.15; 358/1.9
(58) Field of Classification Search ............ 358/1.15, 358/1.9
See application file for complete search history.

(56) References Cited

U.S. PATENT DOCUMENTS
2003/0056179 A1 3/2003 Mori
2008/0024802 A1* 1/2008 Kato .................. 358/1.9

FOREIGN PATENT DOCUMENTS
| JP | 2003-162407 A | 6/2003 |
| JP | 2003-162519 A | 6/2003 |
| JP | 2006-190311 A | 7/2006 |
| JP | 2007-164444 A | 6/2007 |
| JP | 2007-256991 A | 10/2007 |

OTHER PUBLICATIONS

XML Paper Specification : Overview,(online),Microsoft, searched at Mar. 14, 2008 internet URL : http://www.microsoft.com/whdc/xps/default.
PrintTicket and PrintCapabilities Support in Windows Print Drivers, [online], Microsoft, Feb. 6, 2006 searched at Mar. 14, 2008 internet URL : http://www.microsoft.com/whdc/device/print/XPSDrv_PrintTicket.mspxXPSDrv_PrintTicket.doc.

* cited by examiner

Primary Examiner — Charlotte M Baker
Assistant Examiner — Justin Katzwhite
(74) Attorney, Agent, or Firm — Canon USA Inc. IP Division

(57) ABSTRACT

A structured document conversion apparatus is configured to convert structured document data that contains document data in a plurality of nodes in a tree structure and can associate a print attribute with each of the plurality of nodes. The structured document conversion apparatus reflects a print attribute of a lower node in other portions. The structured document conversion apparatus deletes the lower layer print attribute. The structured document conversion apparatus generates structured document data in which the print attribute is associated with a highest hierarchical layer in the tree structure.

15 Claims, 21 Drawing Sheets

```
1001    <PrintTicket>
1002a     <Feature name="RESOLUTION">
1003a       <Option name="600dpi"/>
          </Feature>
1002b     <Feature name="PRINTING METHOD">
1003b       <Option name="TWO-SIDED PRINTING"/>
          </Feature>
1002c     <Feature name="PAGE SIZE">
1003c       <Option name="A4"/>
          </Feature>
1002d     <Feature name="LAYOUT">
1003d       <Option name="PagePerSheet:2"/>
          </Feature>
1002e     <Feature name="ROTATE PRINT ORIENTATION 180 DEGREES">
1003e       <Option name="OFF"/>
          </Feature>
1002f     <Feature name="PRINT BY WIDENING PRINTING AREA">
1003f       <Option name="On"/>
          </Feature>
1002g     <Feature name="PERFORM BORDERLESS PRINTING">
1003g       <Option name="On"/>
          </Feature>
        </PrintTicket>
```

| CONTENT OF FEATURE | FEATURES THAT CAN BE REFLECTED IN DRAWING DATA | FEATURES THAT CANNOT BE REFLECTED |
| --- | --- | --- |
| | DRAWING DATA PROCESSING METHOD | DELETE ITEM |
| BLACK GENERATION PROCESS IN CMYK | REFLECT IN COLOR | PAPER FEED PORT SETTING |
| BORDERLESS PRINT SETTING | CHANGE EFFECTIVE PRINTING AREA | COLOR OF MEDIA |
| ICM RENDERING INTENT | REFLECT IN COLOR | MEDIA TYPE |
| FACE UP SETTING | PROCESS LOGICAL COORDINATES | MEDIA SIZE |
| EFFECTIVE PRINTING AREA | CHANGE EFFECTIVE PRINTING AREA | PAPER DISCHARGE SETTING |
| MIRROR SETTING | PROCESS LOGICAL COORDINATES | COLOR PROFILE OF BLENDING PROCESS |
| NEGATIVE SETTING | REFLECT IN COLOR | |
| PRINT ORIENTATION | PROCESS LOGICAL COORDINATES | DESIGNATION OF COLOR MANAGEMENT |
| COLOR SETTING | REFLECT IN COLOR | |
| POSTER PRINTING | PROCESS LOGICAL COORDINATES | OUTPUT COLOR PROFILE |

| Public PrintTicket (SETTINGS THAT CAN BE SWITCHED BETWEEN DOCUMENTS) | |
|---|---|
| BINDING SETTING (Document) | PAGE LAYOUT (Document) |
| COLLATE SETTING (Document) | PAPER DISCHARGE SETTING |
| BACK COVER SETTING (Document) | ROLL CUT (Document) |
| FRONT COVER SETTING (Document) | SEPARATOR SHEET (Document) |
| TWO-SIDED PRINT SETTING (Document) | STAPLE (Document) |

FIG.15

1701 FixedPage BEFORE PRINT ATTRIBUTE CONVERSION

```
<FixedPage Width="793.76" Height="1122.56" xmlns="http://" xml:lang="und">

</FixedPage>
```

1702 PrintTicket BEFORE PRINT ATTRIBUTE CONVERSION

```
<PrintTicket>
  <Feature name="Stamp">
    <psf:Value xsi:string">CONFIDENTIAL</psf:Value>
  </Feature>
</PrintTicket>
```

DISPLAY/PRINT RESULT 1705

CONFIDENTIAL

⇒

1703 FixedPage AFTER PRINT ATTRIBUTE CONVERSION

```
<FixedPage Width="793.76" Height="1122.56" xmlns="http://" xml:lang="und">
  <Glyphs Fill="#ff000000" FontUri="/Documents/1/Resources/Fonts/1.ttf"
    FontRenderingEmSize="14.7206" StyleSimulations="None" OriginX="70.4"
    OriginY="86.24"
    Indices="150338;15037;15051,34;15038;15038;15026" UnicodeString=
    "CONFIDENTIAL"
  </Glyphs>
</FixedPage>
```

1704 PrintTicket AFTER PRINT ATTRIBUTE CONVERSION

```
<PrintTicket>

</PrintTicket>
```

DISPLAY/PRINT RESULT 1706

CONFIDENTIAL

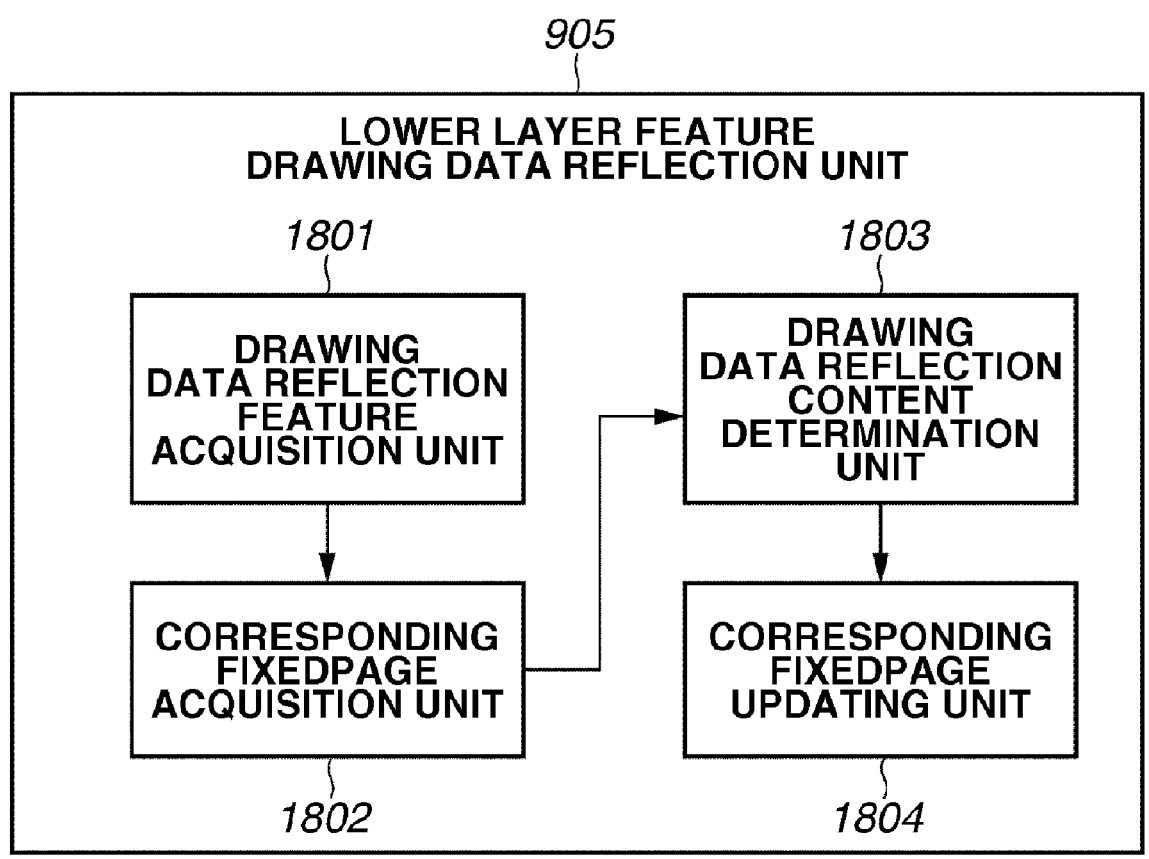

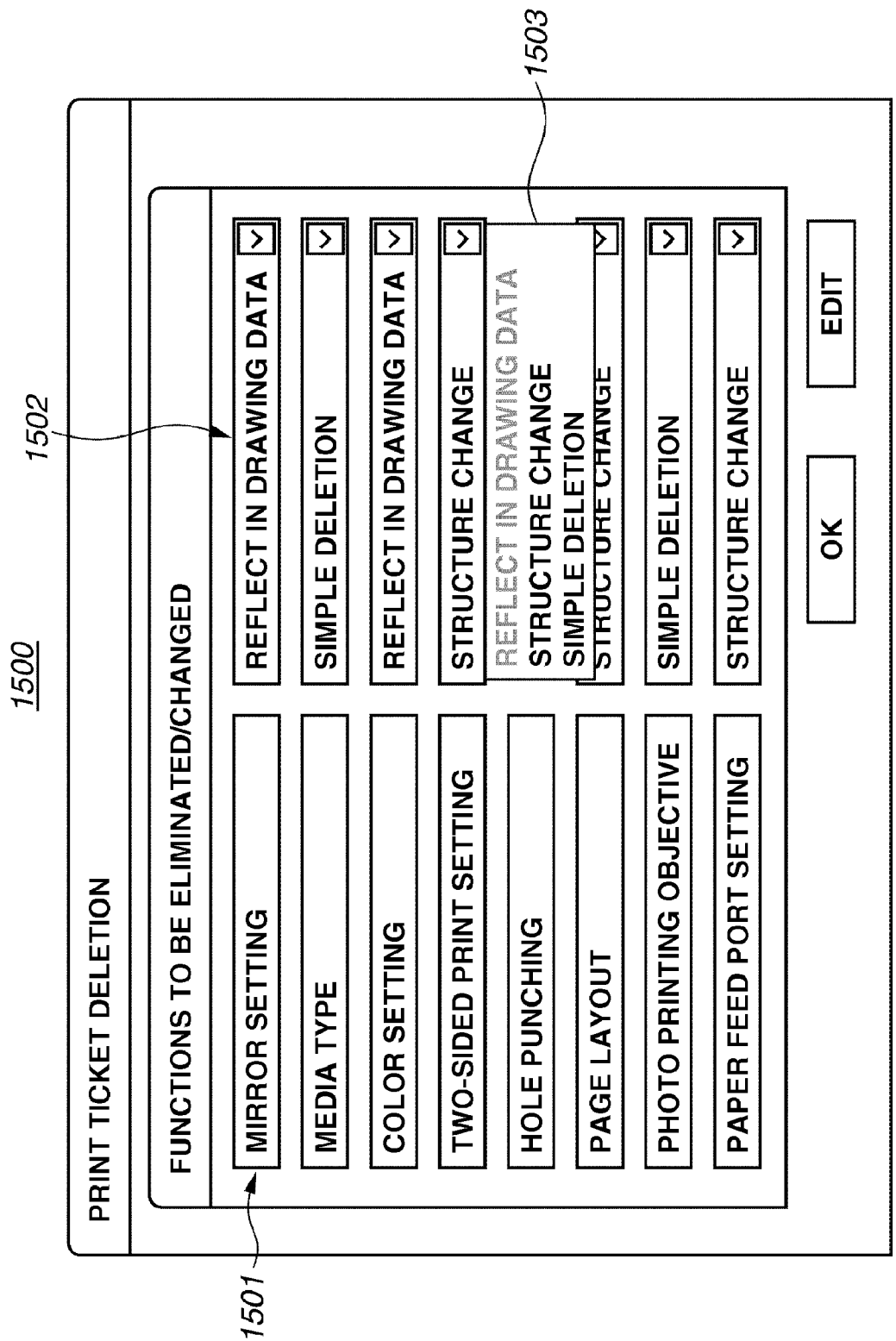

STRUCTURED DOCUMENT CONVERSION APPARATUS, STRUCTURED DOCUMENT CONVERSION METHOD, AND STORAGE MEDIUM

BACKGROUND OF THE INVENTION

1. Field of the Invention

The present invention relates to a structured document conversion apparatus, a structured document conversion method, and a storage medium. In particular, the present invention is suitable for converting a structured document.

2. Description of the Related Art

Microsoft Windows Vista® is an operating system (OS) distributed by Microsoft. Windows Vista® supports Extended Markup Language (XML) Paper Specification (XPS), which is a new XML-based document format. An XPS document has a document format including three hierarchical layers called FixedDocumentSequence, FixedDocument, and FixedPage. XML documents containing print attributes referred to as print tickets, can be associated with nodes of each hierarchical layer. A job level print ticket is associated with FixedDocumentSequence. A document level print ticket is associated with FixedDocument1. A page level print ticket is associated with FixedPage1. Since the print ticket can be specified for each node of each hierarchical layer, an XPS document can change, for example, an output size for each FixedPage, or staple setting for each FixedDocument.

The XPS document has an aspect of a control language such as a print spooler format used during printing or a Page Description Language (PDL), and another aspect of an ordinary document. Regarding the document aspect, the XPS document can be used as a document format for saving, reusing, publishing, and distributing various documents, in the same manner as a Portable Document Format (PDF) file distributed by Adobe Systems Incorporated. The XPS document can retain a print ticket for each node of the hierarchical layers, and as a result, it is possible to create and distribute XPS documents associated with print settings (print attributes).

After the release of Windows Vista®, there are printing apparatuses that can directly print XPS documents in PDL. Such printing apparatuses print XPS documents using a printer driver that generates XPS documents. Printing can be performed by directly inputting an XPS document that has been generated, published, and distributed.

The XPS document includes print setting data and drawing data, and is utilized in applications and in printing apparatuses. However, handling of print settings (print attributes) described in a print ticket depends on an apparatus or device processing the XPS document. For example, a print ticket that cannot be processed by a printing apparatus is ignored by the printing apparatus.

To avoid the situation where a print ticket cannot be processed, there is a method in which a print driver or a print utility generates new printing data by combining a print ticket that cannot be processed by a printing apparatus with drawing data, so that the printing apparatus can process the print ticket (refer to Japanese Patent Application Laid-Open No. 2007-164444).

There is a method in which, when an application copies or edits a portion of a document, an order of priority is set to print attributes associated with each node, so that print attributes are replaced according to the nodes of the hierarchical layers (refer to Japanese Patent Application Laid-Open No. 2003-162519).

Although the methods discussed in Japanese Patent Application Laid-Open No. 2007-164444 and Japanese Patent Application Laid-Open No. 2003-162519 generate a new document by processing the print attributes, the new document remains dependent on the apparatus or device processing the document.

The method discussed in Japanese Patent Application Laid-Open No. 2007-164444 changes a document to a form in which print attributes added to the document can be processed by the printing apparatus. As a result, when a document is directly printed by the printing apparatus, the output is in the intended format. However, if the document is printed by a printing apparatus with different functions, or if content of the document is confirmed as an ordinary document by a different application, the format of the document changes.

In the method discussed in Japanese Patent Application Laid-Open No. 2003-162519, a specific application interprets the print attribute added to the nodes and replaces the print attributes for each layer by setting an order of priority according to the processes. However, the generated document cannot maintain a similar format when processed by a general application. In particular, if the document is a structured document in which a print attribute is added to each layer, it may be necessary to understand the entire layer structure of the document to perform an appropriate process.

For example, only a job level print ticket of the FixedDocumentSequence can be edited and processed via a print setting screen of a general printer driver. Therefore, when specifying a color/monochrome print setting or a print paper size setting, a job level print ticket is acquired and processed. If a print attribute such as monochrome printing is embedded in a page level print ticket added to a specific FixedPage, there is no guarantee that the printing apparatus will print the page in monochrome. General applications often determine only a job level print ticket that can be acquired without understanding a structure of the document and identifies a paper size to be displayed.

When an XPS document is to be used as a print document, print attributes are generated so that functions of a specific printing apparatus can be used. However, if the XPS document is utilized as an ordinary document, or as a print document on a different printing apparatus, the printing format may change. As a result, a user using the XPS document in various applications and printing apparatuses may obtain inconsistent results.

SUMMARY OF THE INVENTION

The present invention is directed to a method of generating structured document data that a user using the XPS document in various applications and printing apparatuses may obtain consistent results.

According to an aspect of the present invention, a structured document conversion apparatus configured to convert structured document data that contains document data in a plurality of nodes in a tree structure and can associate a print attribute with each of the plurality of nodes is provided. The structured document conversion apparatus includes a reflection unit configured to reflect a print attribute associated with a node of a hierarchical layer lower than a highest hierarchical layer in the tree structure in other portions of the tree structure according to a content of the print attribute, and a deletion unit configured to delete, when the reflection unit reflects the print attribute associated with the node of the hierarchical layer lower than the highest hierarchical layer in the tree structure in the other portions of the tree structure, the print attribute before the reflection, wherein the structured document conversion apparatus generates structured document data in which the print attribute is associated with the highest hierarchical layer in the tree structure.

According to another aspect of the present invention, a structured document conversion apparatus configured to convert structured document data that contains document data in a plurality of nodes in a tree structure and can associate a print attribute with each of the plurality of nodes is provided. The structured document conversion apparatus includes a reflection unit configured to reflect a print attribute associated with a node of a hierarchical layer lower than a highest hierarchical layer in the tree structure in other portions of the tree structure according to a content of the print attribute, and a deletion unit configured to delete, when the reflection unit reflects the print attribute associated with the node of the hierarchical layer lower than the highest hierarchical layer in the tree structure in the other portions of the tree structure, the print attribute before the reflection, wherein the structured document conversion apparatus generates structured document data in which the print attribute is not associated with any hierarchical layer other than the highest hierarchical layer in the tree structure.

According to another aspect of the present invention, a structured document conversion apparatus configured to convert structured document data that contains document data in a plurality of nodes in a tree structure and can associate a print attribute with each of the plurality of nodes is provided. The structured document conversion apparatus includes a reflection unit configured to reflect a lower layer print attribute associated with a node of a hierarchical layer lower than a highest hierarchical layer in the tree structure in at least one of an upper layer print attribute associated with a node positioned higher than the node of the lower hierarchical layer and drawing data of the node of the lower hierarchical layer; and a deletion unit configured to delete the lower layer print attribute, wherein the structured document conversion apparatus generates structured document data in which the print attribute is not associated with any hierarchical layer other than the highest hierarchical layer in the tree structure.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 illustrates an example of a configuration of a print ticket in which print attributes are described according to the exemplary embodiment of the present invention.

FIG. 12 illustrates an example of features that can be reflected in drawing data and features that cannot be reflected in drawing data according to the exemplary embodiment of the present invention.

FIG. 13 illustrates an example of features that can be set as an upper layer reflection feature according to the exemplary embodiment of the present invention.

FIG. 15 illustrates an example of a general outline of a drawing data reflection method according to the exemplary embodiment of the present invention.

FIG. 16 illustrates an example of a detailed configuration of a lower layer feature drawing data reflection unit according to the exemplary embodiment of the present invention.

FIG. 21 illustrates an example of an elimination method editing/approval screen displayed when confirming and correcting the elimination method for each feature according to the exemplary embodiment of the present invention.

DETAILED DESCRIPTION OF THE EMBODIMENTS

Various exemplary embodiments, features, and aspects of the invention will be described in detail below with reference to the drawings.

Figure 1:
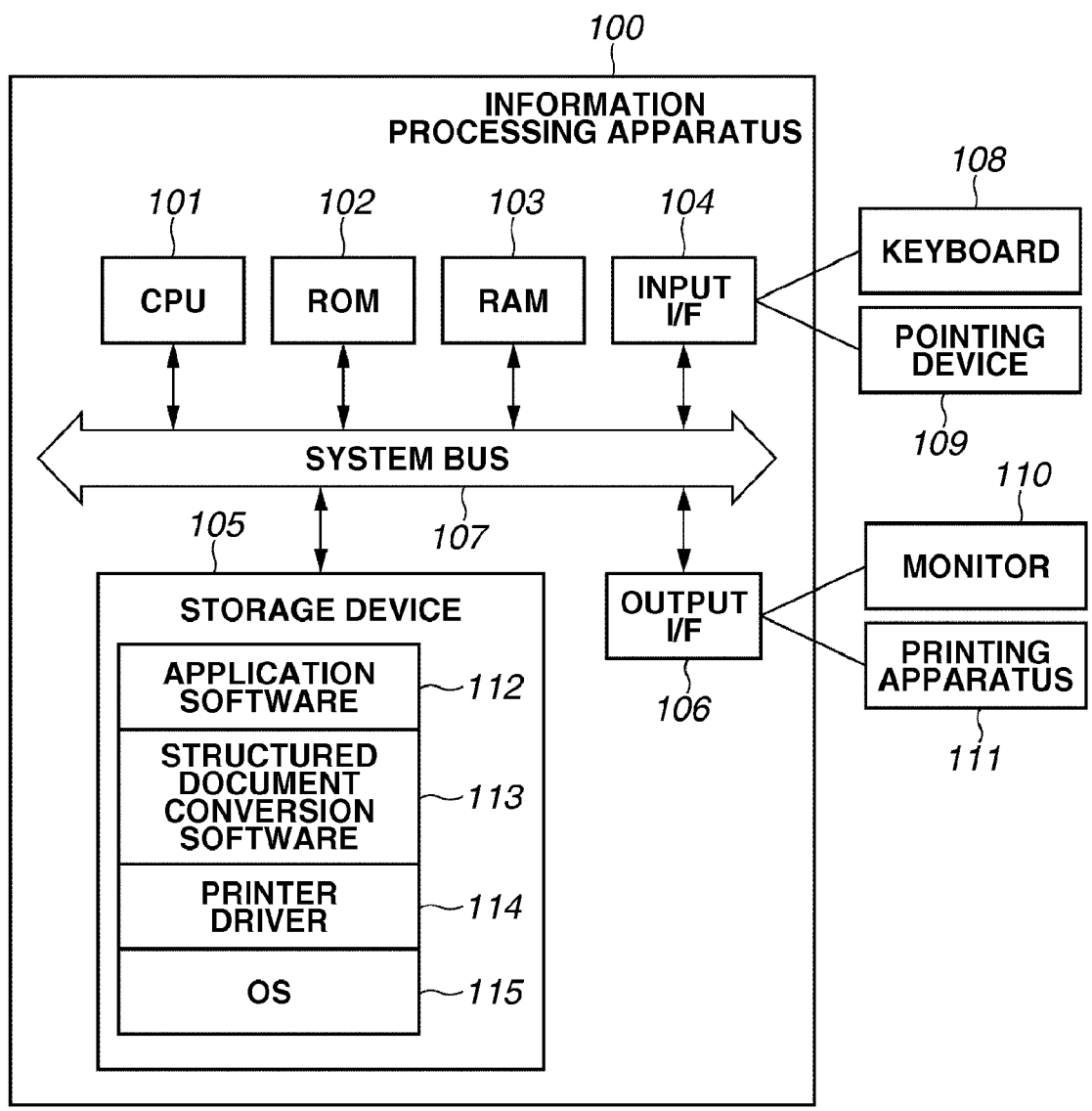
FIG. 1 illustrates a configuration of an information processing apparatus according to an exemplary embodiment of the present invention.

FIG. 1 illustrates a configuration of an information processing apparatus according to an exemplary embodiment of the present invention.

A central processing unit (CPU) 101 controls the entire information processing apparatus 100 according to a program stored in a read-only memory (ROM) 102, a random access memory (RAM) 103, or a storage device 105. The RAM 103 is also used as a work area when the CPU 101 performs various processes. The storage device 105 stores an operating system (OS) and application software 112. The storage device 105 stores structured document conversion software 113 and a printer driver 114 used in performing a print attribute conversion process.

Input devices, such as a keyboard 108 and a pointing device 109, are used by the user to give various instructions to the information processing apparatus 100 via an input interface (I/F) 104. An output I/F 106 outputs data to an external device, such as a monitor 110 and a printing apparatus 111. The printing apparatus 111 can be connected to the information processing apparatus 100 via a network as well as a local input/output (I/O). Each of the units inside the information processing apparatus 100 is connected to a system bus 107, which is a common data bus, and the units exchange data with each other via the system bus 107.

Figure 2:
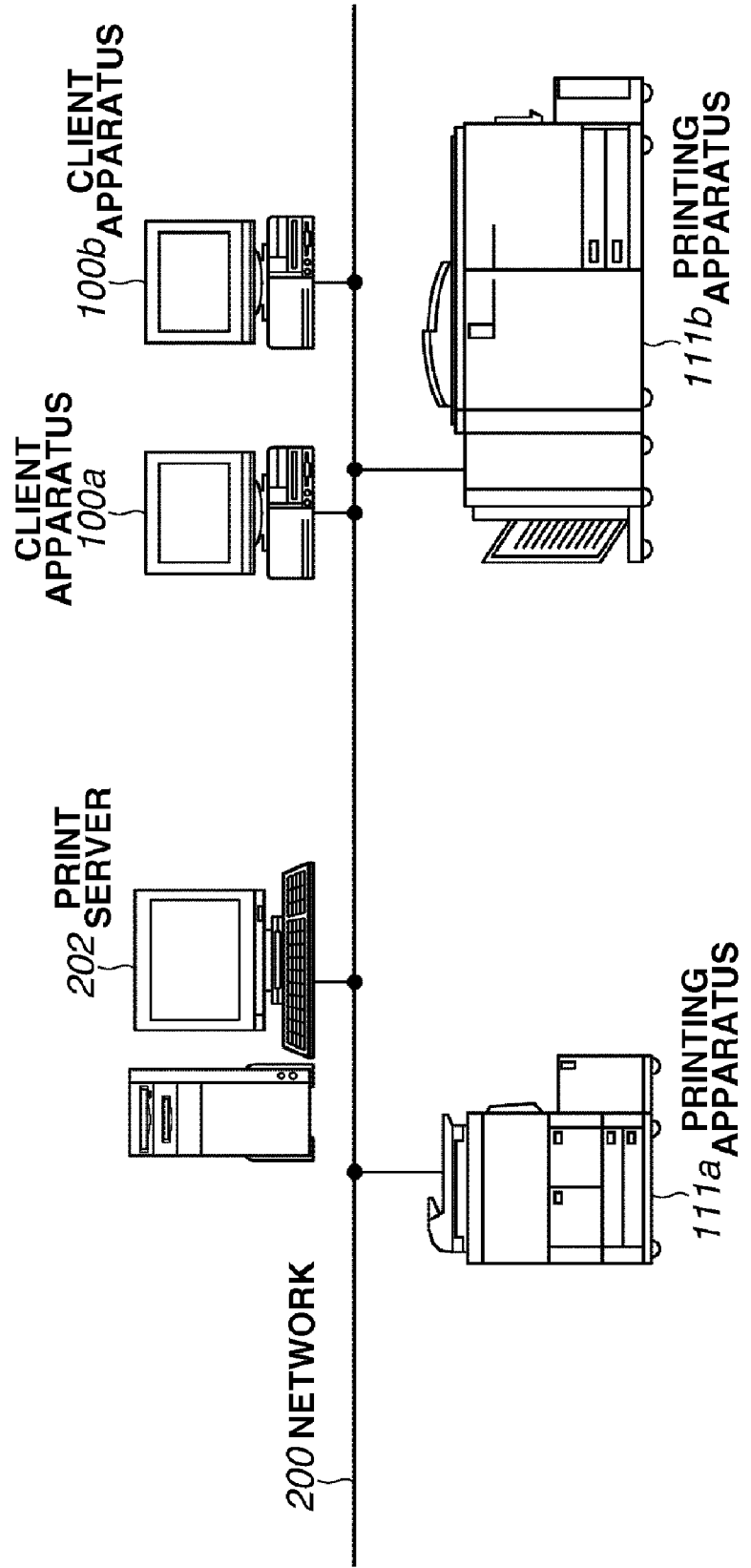
FIG. 2 illustrates an example of a configuration of a printing system according to the exemplary embodiment of the present invention.

FIG. 2 illustrates an example of a configuration of a printing system. Referring to FIG. 2, client apparatuses 100a and 100b include functions that correspond to the information processing apparatus 100 illustrated in FIG. 1, a print server 202, and printing apparatuses 111a and 111b are connected via a network 200 to be communicable with each other.

The client apparatus 100 generates structured documents such as an XPS document. The client apparatus 100 utilizes the generated structured document or transmits the generated structured document to other apparatuses via the network 200. When an XPS document is to be used as a print document, the client apparatus 100 generates an XPS document to which are added print attributes (print settings) corresponding to, for example, functions of the printing apparatus 111b. The XPS document is generated by a printer driver or a print data generation application installed in the client apparatus 100a. The printing apparatus 111b prints the XPS document on paper by performing a printing process on the generated XPS document utilizing the function of the printing apparatus 111b.

The XPS document, to which are added print attributes corresponding to functions of the printing apparatus 111b, can be transmitted to the printing apparatus 111a having a low functionality compared to the printing apparatus 111b. The printing apparatus 111a thus prints the XPS document. The printing apparatus 111a may ignore functions among print attributes added to the XPS document that are not included in the printing apparatus 111a and print the XPS document. As a result, when the same XPS document is printed by different printing apparatuses, the format of the print outputs may be different.

The XPS document can be used as an ordinary document. The XPS document is generated by the application software 112 installed in the client apparatus 100a and stored in the ROM 102 or the storage device 105. The client apparatus 100a then transfers, distributes, or discloses the generated XPS document to the client apparatus 100b. The client apparatus 100b can display or edit the XPS document transferred, distributed, or disclosed by the client apparatus 100a using the application software 112. The utilization of the print attributes by the application software 112 depends on the functions of the application software 112. Therefore, the same XPS document can be displayed in a different format, or an added print attribute can be deleted from the XPS document according to the application software 112 utilizing the XPS document.

The same XPS document can be used as both a print document and as an ordinary document. For example, the client apparatus 100a generates an XPS document to which are added print attributes corresponding to the functions of the printing apparatus 111b, and stores the XPS document in the print server 202. The XPS document can thus be used as both a print document and an ordinary document.

The client apparatuses 100a and 100b use the application software 112 to access the XPS document stored in the print server 202. The printing apparatuses 111a and 111b access the XPS document stored in the print server 202, and the printing apparatuses 111a and 111b print the XPS document. Such a process is referred to as pull printing.

As described above, the same XPS document can be displayed in a different format depending on the application software 112, or be output in a different format by the printing apparatuses 111a and 111b.

The print attribute conversion process in the present exemplary embodiment prevents differences in format. For example, the client apparatus 100a performs the print attribute conversion process on the XPS document including print attributes of the printing apparatus 111b generated by the client apparatus 100a. The XPS document on which the print attribute conversion process is performed is printed by the printing apparatus 111a, distributed or disclosed to the client apparatus 100b, or stored in the print server 202. As a result, the format of the XPS document is prevented from becoming different due to the application software 112 or the printing apparatuses 111a and 111b.

Figure 3:
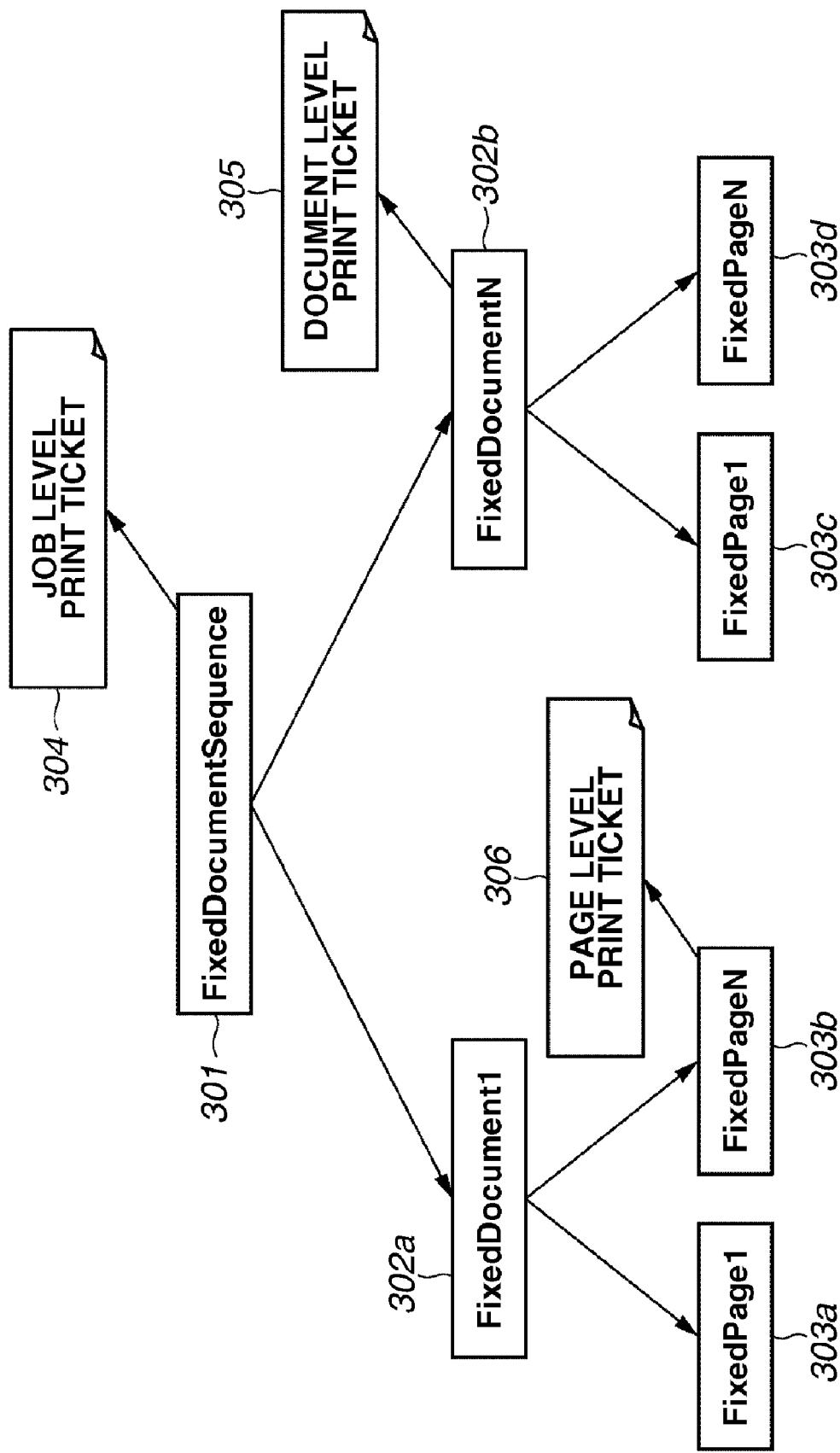
FIG. 3 is a schematic diagram illustrating an example of an XPS document according to the exemplary embodiment of the present invention.

FIG. 3 is a schematic diagram illustrating an XPS document, which is an example of a structured document.

Referring to FIG. 3, a FixedDocumentSequence 301 corresponds to a job, a FixedDocument 302 corresponds to a document, and a FixedPage 303 corresponds to a page in a document. The XPS document has a tree structure, and the FixedDocumentSequence 301, the FixedDocument 302, and the FixedPage 303 include nodes associated with the tree structure.

An XPS document includes one FixedDocumentSequence 301. The FixedDocumentSequence 301 includes a plurality of FixedDocuments 302a and 302b. Each FixedDocument 302a and 302b includes a plurality of FixedPages 303a and 303b, and 303c and 303d, respectively. Print attributes (print settings) can be arbitrarily associated with the FixedDocumentSequence 301, FixedDocument 302, and FixedPage 303. Such print attributes are referred to as print tickets.

Data including print attributes associated with the FixedDocumentSequence 301 is referred to as a job level print ticket 304. Data including print attributes associated with the FixedDocument 302 is referred to as a document level print ticket 305. Data including print attributes associated with the FixedPage 303 is referred to as a page level print ticket 306. The job level print ticket 304 sets print attributes of the entire job. The document level print ticket 305 sets print attributes to each document. The page level print ticket 306 sets print attributes of each page.

Figure 4:
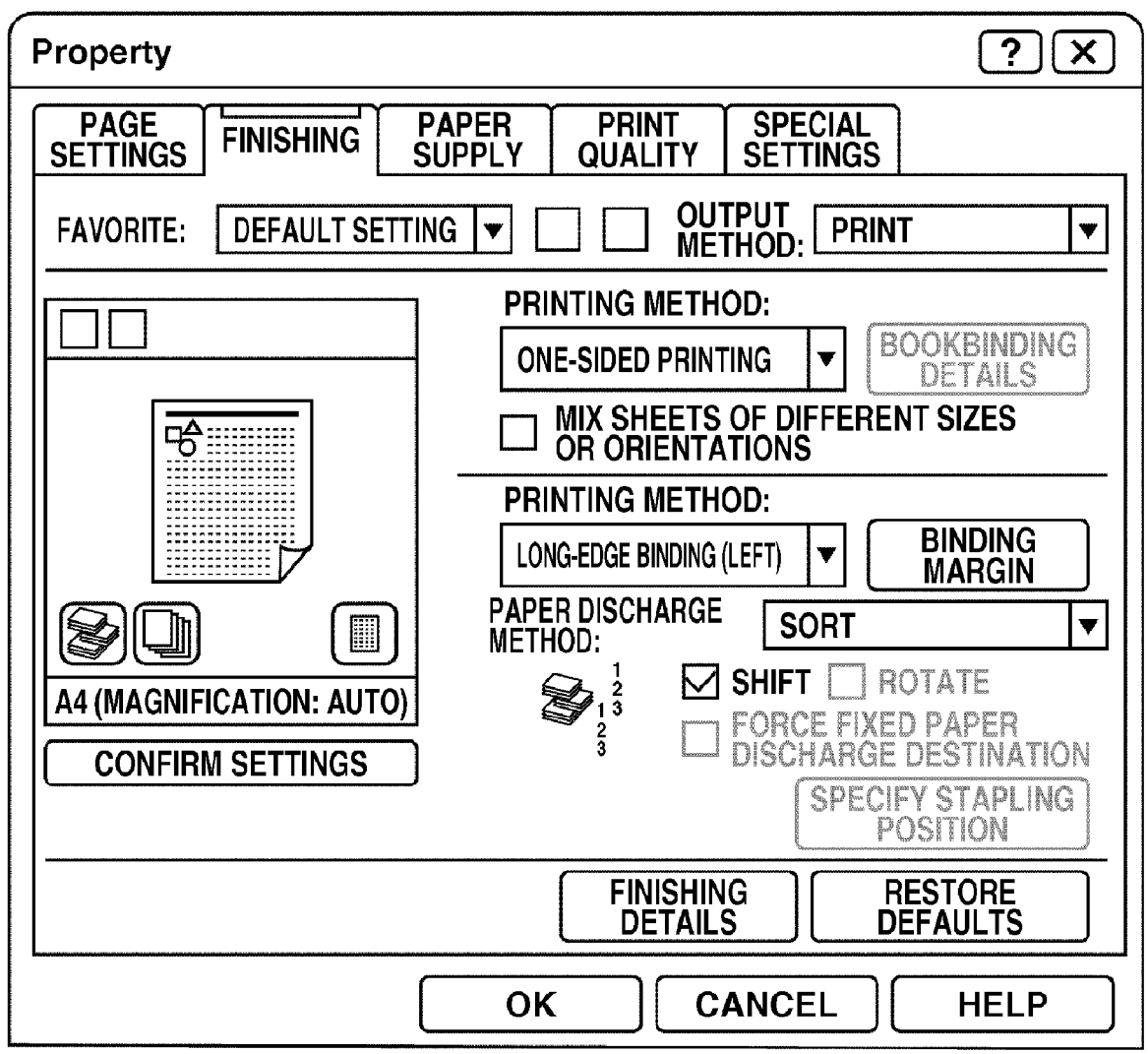
FIG. 4 illustrates an example of a print setting screen displayed when a user sets print attributes to the entire job according to the exemplary embodiment of the present invention.
Figure 5:
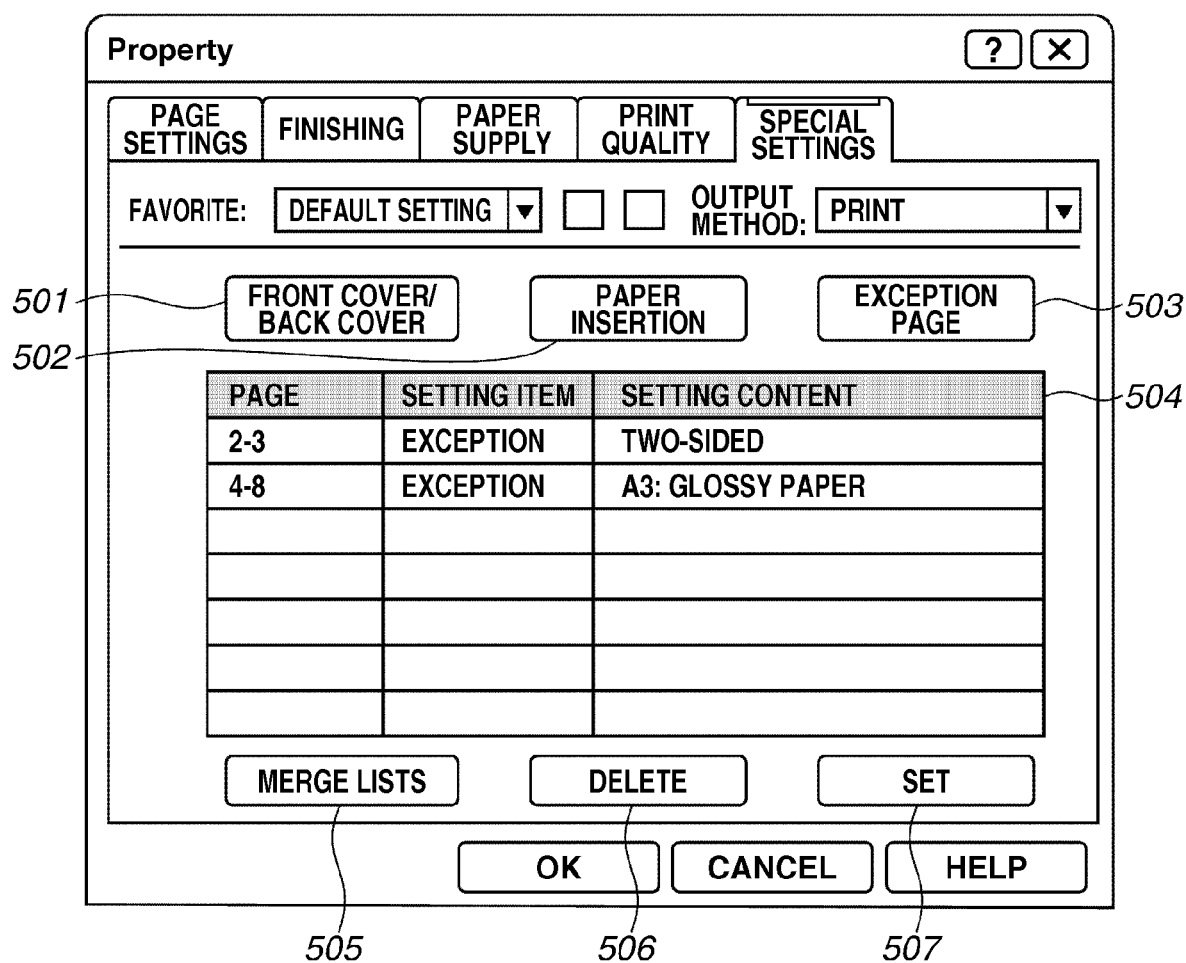
FIG. 5 illustrates an example of a print setting screen displayed when the user selects a "special setting" tab according to the exemplary embodiment of the present invention.

FIGS. 4 and 5 illustrate examples of a print setting screen displayed when associating print attributes described in the job level print ticket 304, the document level print ticket 305, and the page level print ticket 306 with the XPS document. The print setting screens illustrated in FIGS. 4 and 5 are displayed, for example, on the monitor 110 of the client apparatus 100a or 100b.

FIG. 4 illustrates an example of a print setting screen displayed when setting print attributes to the entire job.

Referring to FIG. 4, a print setting screen 400 is called up by an application, a printer driver, or a print utility, mainly when processing the job level print ticket 304. The print setting screen 400 is called up when adding print attributes to an XPS document to which print attributes are not added, and editing the print attributes.

A user performs a "finishing process setting" on the print setting screen 400 illustrated in FIG. 4 by operating the keyboard 108 or the pointing device 109. The job level print ticket 304 is thus generated according to the setting, and associated with the FixedDocumentSequence 301. Examples of the finishing process are one-sided/two-sided printing, stapling, sorting, punching, hole-cutting, and binding processes.

Similarly, if the user selects a "page settings" tab, a "paper supply" tab, or a "print quality" tab on the print setting screen 400, a print setting screen according to the selected tab is displayed. A content set on the print setting screen is then reflected in the job level print ticket 304.

A commonly-used method when specifying a setting which is different from a setting for the entire job (i.e., setting which is different from the basic setting) to a portion of pages or a portion of a range of pages including a document in a job will be described below. Such specification of a setting different from the entire job, to a portion of pages or a range of pages is also referred to as "specifying a page exception setting." The page exception setting is specified via a print setting screen displayed when the user selects a "special settings" tab on the print setting screen 400 illustrated in FIG. 4. A setting content is reflected in the document level print ticket 305 or the page level print ticket 306.

FIG. 5 illustrates an example of a print setting screen displayed when the user selects the "special settings" tab.

Referring to FIG. 5, a print setting screen 500 is used to set print attributes different from print attributes set to the entire job using a print setting screen displayed by the user selecting a "page settings" tab, a "finishing" tab, a "paper supply" tab, or a "print quality" tab. The print setting screen 500 illustrated in FIG. 5 is a sheet for setting print attributes different from a setting to the entire job, to a specific page or a specific range of pages.

A button 501 in the print setting screen 500 is used to set a front cover or a back cover other than the main text data. A button 502 is used to set a sheet other than the main text data to be inserted. A button 503 is used to specify a setting different from a setting to the entire job to a specific page or a specific range of pages. A list 504 lists "items different from the setting to the entire job" set by the user pressing the buttons 501, 502, and 503. In the example illustrated in FIG. 5, the list 504 displays, from the left end, a column indicating a page or a range of pages to which a setting is to be specified, a column indicating a setting item, and a column indicating a setting content. The display is an example, and other formats and items can be displayed on the list 504.

If the same special settings are specified to adjacent pages or a range of pages specified on the list 504 by a user operation, the settings can be merged using a list merging button 505. The user selects settings to adjacent pages or range of pages that the user wishes to merge, from the list 504 displaying special settings. The user then presses the list merging button 505 and the selected settings are merged.

A delete button 506 is provided to delete special settings listed in the list 504 according to a user operation. The user selects a setting that the user wishes to delete from the list 504 displaying the special settings. The user then presses the delete button 506, and the selected setting is deleted.

A set button 507 is provided to change a content of a setting in the special settings listed in the list 504 according to a user operation. The user selects a setting that the user wishes to change from the list 504 displaying the special settings. The user then presses the set button 507, and the selected setting can be changed.

The document level print ticket 305 or the page level print ticket 306 are generated according to the above-described settings, and are associated with the FixedDocument 302 or the FixedPage 303. As a result, a print ticket is associated with each hierarchical layer of the XPS document illustrated in FIG. 3, so that print attributes are added to each hierarchical layer.

Figure 6:
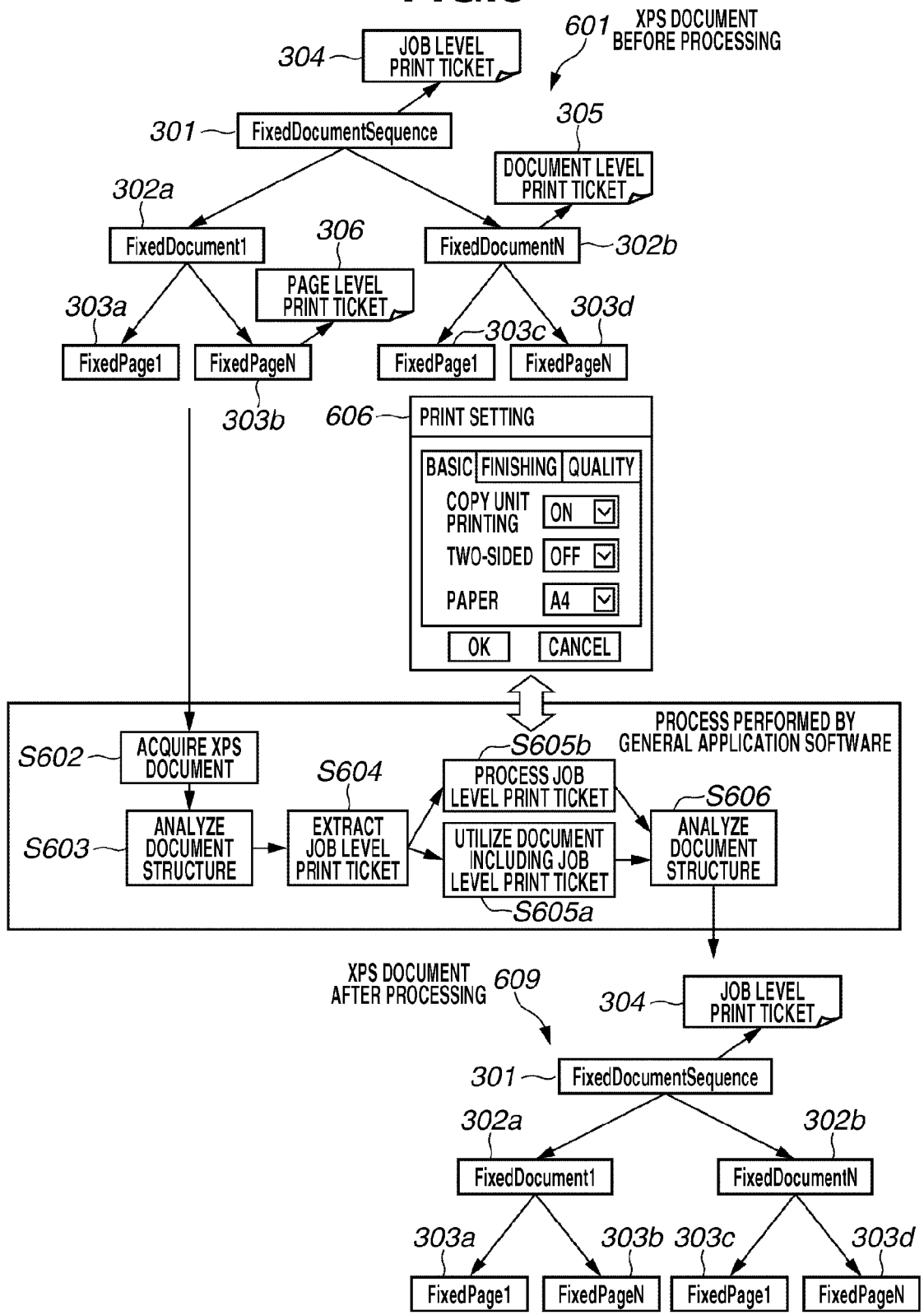
FIG. 6 is a schematic diagram illustrating a process flow of general application software processing an XPS document in which print attributes are added according to the exemplary embodiment of the present invention.

FIG. 6 is a schematic diagram illustrating a process flow of processing an XPS document to which are added print attributes, by general application software.

Unlike an application or a printer driver that displays a print setting screen illustrated in FIGS. 4 and 5, the application software does not analyze an internal structure of an XPS document to understand and process print attributes associated with each layer. The application software handles an XPS document as an ordinary document. For example, the application software displays content of the XPS document or converts the XPS document to an internal document format of the application. A printing process performed by a printing apparatus that cannot switch print attributes for each page or can only switch the print attributes to a specific print attribute is similar to such general application software.

Referring to FIG. 6, the application software processes the XPS document 601 for each layer. In step S602, the software acquires the XPS document 601.

In step S603, the application software analyzes a document structure of the acquired XPS document 601. The software can analyze the FixedDocumentSequence 301 in the XPS document 601.

In step S604, the software extracts the job level print ticket 304 associated with the FixedDocumentSequence 301 as a result of the analysis.

In step S605a, the software utilizes the XPS document 601, such as displaying the XPS document 601, using a print attribute set to the extracted job level print ticket 304. Otherwise, in step S605b, the software uses a user interface 606, used to process print attributes, to process the job level print ticket 304.

In step S606, the software then stores the processed XPS document 609.

The document level print ticket 305 and the page level print ticket 306 are often deleted or left in a similar state as when added to the XPS document 601. As a result, the format of the XPS document becomes dependent on the application software utilizing the XPS document. Such a case can similarly occur in a printing apparatus. For example, output result formats of a printing apparatus that interprets print tickets other than the job level print ticket 304 and a printing apparatus that only interprets the job level print ticket 304 are different.

Figure 7:
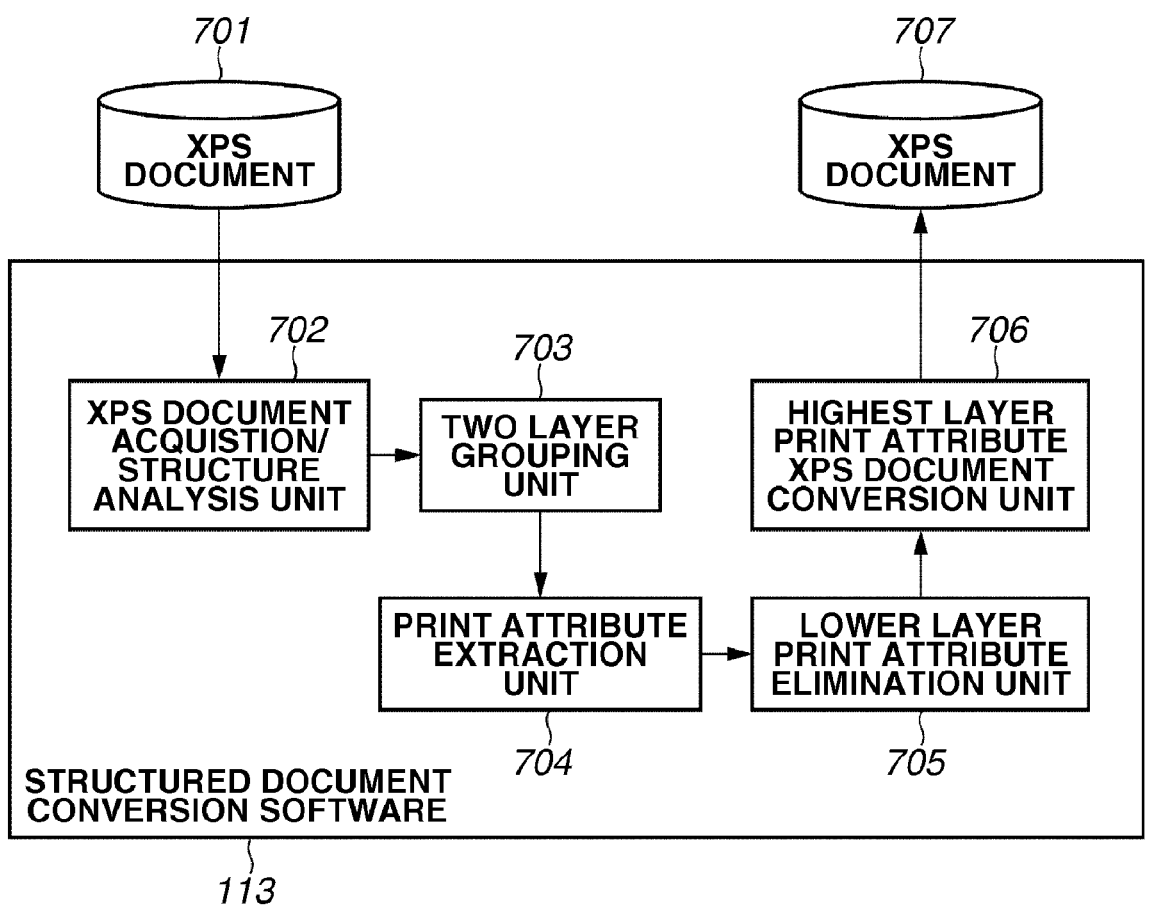
FIG. 7 illustrates an example of a functional configuration of structured document conversion software according to the exemplary embodiment of the present invention.

FIG. 7 illustrates an example of a functional configuration of the structured document conversion software 113. The structured document conversion software 113 realizes a print attribute conversion method using each of the blocks illustrated in FIG. 7.

The structured document conversion software 113 according to the present exemplary embodiment analyzes an XPS document and converts the XPS document, in which print attributes are associated with each hierarchical layer, to an XPS document in which print attributes are only associated with the highest hierarchical layer. The structured document conversion software 113 then stores the converted XPS document. The application software 112 can also read out the XPS document and perform the same process as the structured document conversion software 113, before or after utilizing the XPS document. The printer driver 114 can perform the same process as the structured document conversion software 113 before or after generating print data. The process performed by the structured document conversion software 113 can be performed in the print server 202 or the printing apparatus 111.

Figure 8:
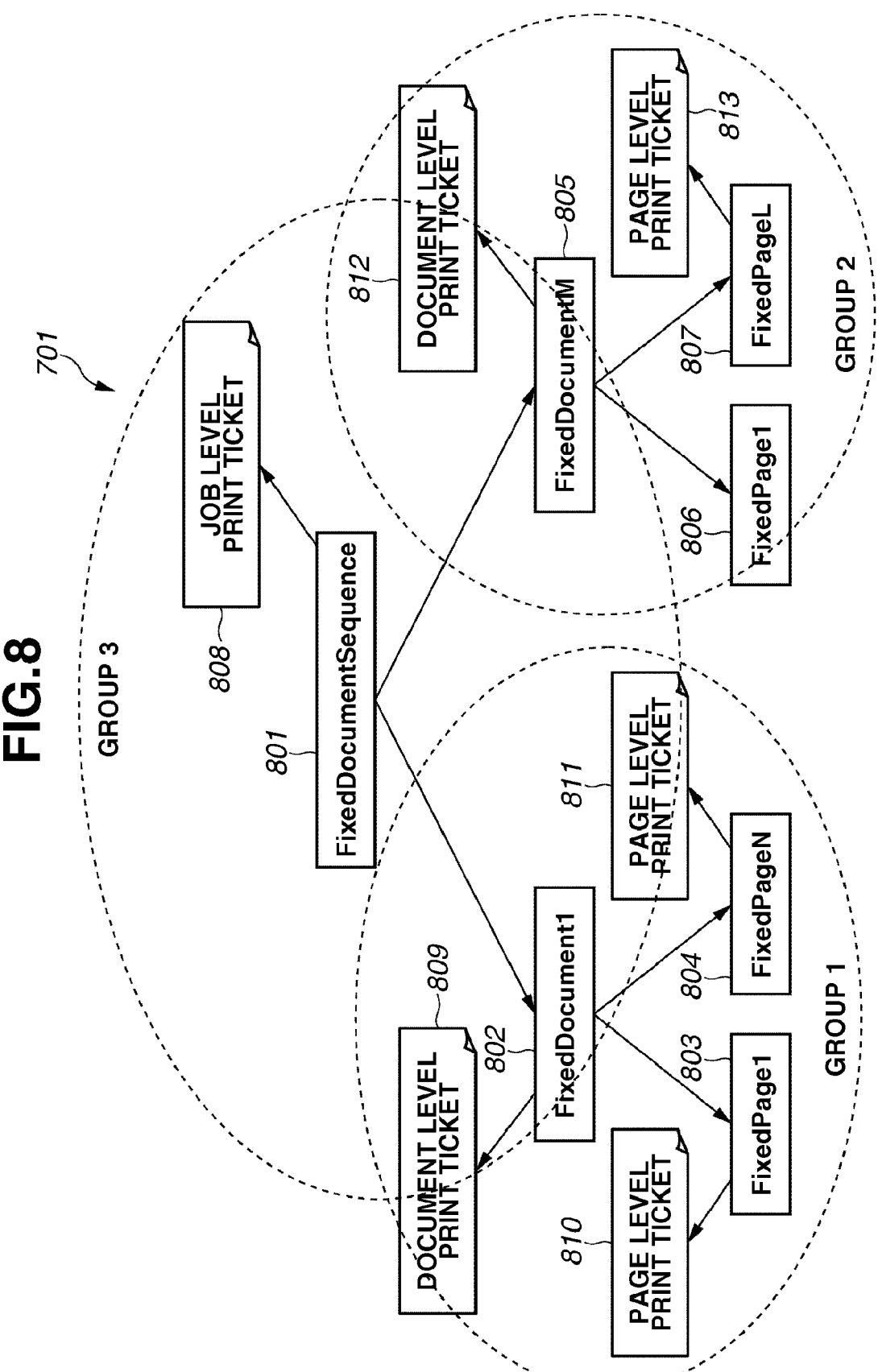
FIG. 8 illustrates an example of an XPS document structure according to the exemplary embodiment of the present invention.

Referring to FIG. 7, an XPS document acquisition/structure analysis unit 702 in the structured document conversion software 113 acquires an XPS document 701 and analyzes the structure of the XPS document 701. FIG. 8 illustrates an example of a structure of the XPS document 701. As a result, the XPS document acquisition/structure analysis unit 702 interprets the XPS document 701 as a hierarchical structure illustrated in FIG. 8.

A two layer grouping unit 703 groups two continuous layers (an upper layer including one node and a lower layer including more than one node positioned below the upper layer) based on the analyzed structure. In the example illustrated in FIG. 8, group 1 is formed including FixedDocument 802 in the upper layer, and FixedPage 803 and FixedPage 804, including N pages (where N is a counting number) from FixedPage 1 to FixedPage N, in the lower layer. Group 2 is formed including FixedDocument 805 in the upper layer, and FixedPage 806 and FixedPage 807, including L pages (where L is a counting number) from FixedPage 1 to FixedPage L, in the lower layer. Group 3 is formed including FixedDocumentSequence 801 in the upper layer, and FixedDocument 802 and FixedDocument 807, including M pages (where M is a counting number) from FixedPage 1 to FixedPage M, in the lower layer.

A print attribute extraction unit 704 then extracts print attributes (print tickets) from the grouped two layers (the upper layer and the lower layer). A maximum of one print ticket is associated with each part, such as a FixedDocument or a FixedPage. As a result, for example, a document level print ticket 809 associated with the FixedDocument 802 is extracted as an upper layer print ticket of group 1 illustrated in FIG. 8. FixedPage 803 and FixedPage 804 including N pages, from FixedPage1 to FixedPage N, N numbers of page level print ticket 811 and page level print ticket 810 are extracted at maximum, as lower layer print tickets of group 1. A print ticket associated with the upper layer will be referred to as an upper layer print attribute, and a print ticket associated with the lower layer will be referred to as a lower layer print attribute as necessary in the description below.

After the print attribute extraction unit 704 extracts the upper layer print attributes and the lower layer print attributes, a lower layer print attribute elimination unit 705 eliminates the lower layer print attributes. The process performed by the lower layer print attribute elimination unit 705 will be described in detail below with reference to FIG. 9.

A highest layer print attribute XPS document conversion unit 706 instructs repeating of processes performed by the two layer grouping unit 703, the print attribute extraction unit 704, and the lower layer print attribute elimination unit 705. As a result, the highest layer print attribute XPS document conversion unit 706 generates an XPS document in which print attributes exist only in the highest layer.

For example, in group 1 illustrated in FIG. 8, when the lower layer print attribute elimination unit 705 eliminates the page level print tickets 810 and 811 which are lower layer print attributes extracted by the print attribute extraction unit 704, only the document level print ticket 809 will exist. Similarly, in group 2, only the document layer ticket 812 will exist. When a similar process is performed in group 3, document level print tickets 809 and 812 which are lower print attributes are eliminated, and only the job level print ticket 808 (the highest layer print attribute) remains. As a result, the highest layer print attribute XPS document conversion unit 706 generates and stores an XPS document 707 (structured document) including print attributes associated with the highest layer (i.e., job level print ticket 808).

Figure 9:
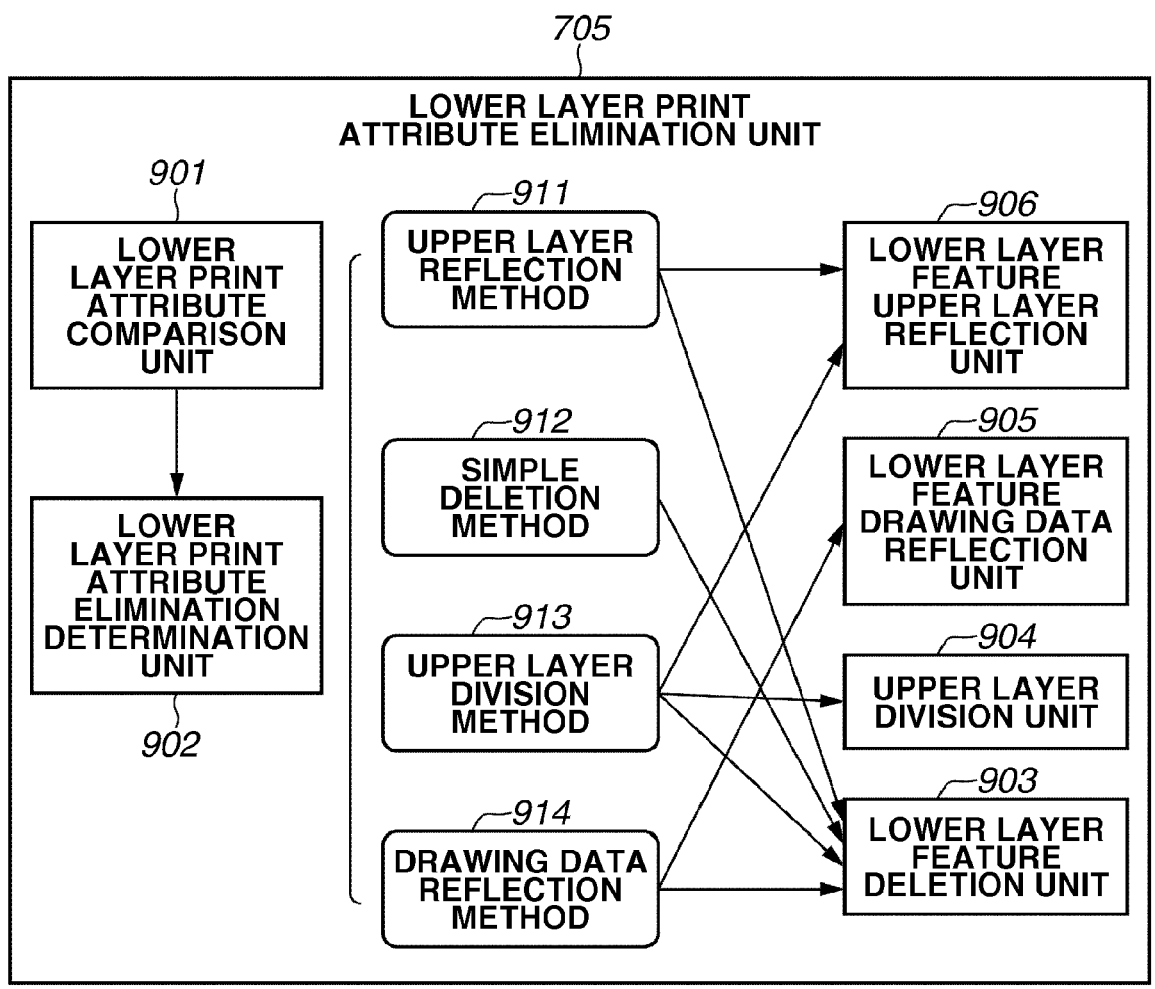
FIG. 9 is a block diagram illustrating an example of a detailed configuration of a lower layer print attribute elimination unit according to the exemplary embodiment of the present invention.

FIG. 9 is a block diagram illustrating an example of a detailed configuration of the lower layer print attribute elimination unit 705.

After the print attribute extraction unit 704 illustrated in FIG. 7 extracts one upper layer print attribute and one or more lower layer print attributes, a lower layer print attribute comparison unit 901 illustrated in FIG. 9 determines whether there is a plurality of lower layer print attributes. If there is a plurality of lower layer print attributes, the lower layer print attribute comparison unit 901 compares the contents of the plurality of lower layer print attributes.

FIG. 10 illustrates an example of a configuration of a print ticket describing print attributes.

Referring to FIG. 10, a print ticket 1000, which contains print attributes of an XPS document, is an XML file. In the print ticket 1000, a plurality of Feature tags 1002a, 1002b, 1002c, 1002d, 1002e, 1002f, and 1002g, indicating functions, are contained in one PrintTicket tag 1001. Option tags 1003a, 1003b, 1003c, 1003d, 1003e, 1003f, and 1003g included in the Feature tags 1002a, 1002b, 1002c, 1002d, 1002e, 1002f, and 1002g are present setting values of functions indicated by the Feature tags. The print ticket 1000 illustrated in FIG. 10 describes a print attribute in which the resolution is 600 dpi, the printing method is two-side printing, the page size is A4, and the layout is two-in-one.

The lower layer print attribute comparison unit 901 compares the Features and Options of the plurality of lower layer print attributes. The lower layer print attribute comparison unit 901 extracts Features having a common Option in all lower layer print attributes, and Features having different Options in several lower layer print attributes.

A lower layer print attribute elimination determination unit 902 then determines a process of eliminating Features extracted by the lower layer print attribute comparison unit 901. In the present exemplary embodiment, Features can be eliminated using an upper layer reflection method 911, a simple deletion method 912, an upper layer division method 913, and a drawing data reflection method 914.

In the upper layer reflection method 911, a lower layer Feature upper layer reflection unit 906 reflects the Feature tag 1002 (and the corresponding Option tag 1003) of the lower layer print attribute in the upper layer print attribute. A lower layer Feature deletion unit 903 then deletes, from the lower layer print attribute, the original Feature tag 1002 (and the corresponding Option tag 1003) existing before reflection in the upper layer print attribute by the lower layer Feature upper layer reflection unit 906.

In the simple deletion method 912, the lower layer Feature deletion unit 903 simply deletes the Feature tag 1002 (and the corresponding Option tag 1003) in the lower layer regardless of the process performed by the lower layer Feature upper layer reflection unit 906.

In the upper layer division method 913, an upper layer division unit 904 divides a single upper layer node into a plurality of upper layer nodes. The upper layer division unit 904 then adds an upper layer print attribute to each of the divided plurality of upper layer nodes. The lower layer Feature upper layer reflection unit 906 reflects the Feature tag 1002 (and the corresponding Option tag 1003) of the lower layer print attribute in the added plurality of upper layer print attributes. The lower layer Feature deletion unit 903 then deletes, from the lower layer print attribute, the Feature tag 1002 (and the corresponding Option tag 1003) of the lower layer reflected by the lower layer Feature upper layer reflection unit 906. The process performed in the upper layer division method will be described in detail below.

In the drawing data reflection method 914, a lower layer Feature drawing data reflection unit 905 reflects the function of the Feature tag 1002 in drawing data described in a FixedPage and the like. The lower Feature deletion unit 903 then deletes, from the lower layer print attribute, the Feature tag 1002 (and the corresponding Option tag 1003) of the lower layer reflected by the lower layer Feature drawing data reflection unit 905. The drawing data reflection method 914 will also be described in detail below.

The lower layer print attribute elimination determination unit 902 determines the method of deleting the lower layer print attribute from among the four methods (i.e., the upper layer reflection method 911, the simple deletion method 912, the upper layer division method 913, and the drawing data reflection method 914). The lower layer print attribute elimination determination unit 902 determines, based on classification of each Feature, contents that are preset (such as a list), or designation from a user using the user interface.

Figure 11:
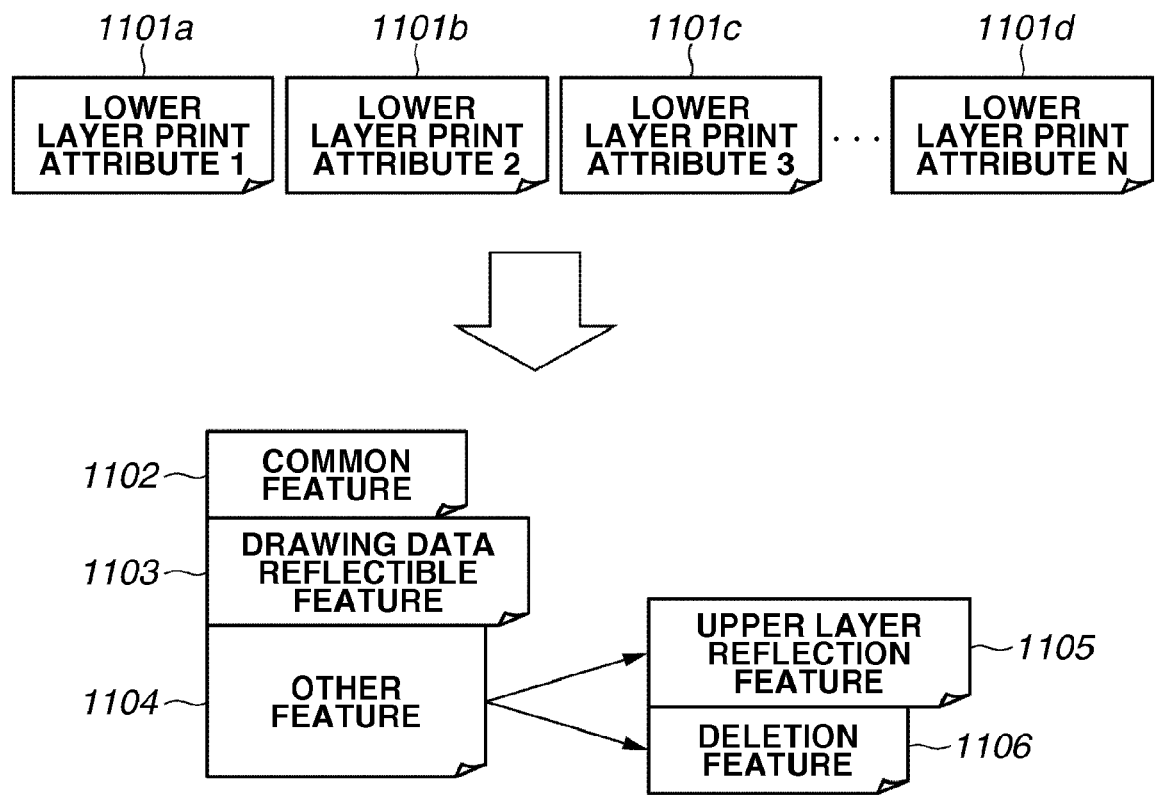
FIG. 11 illustrates an example of a method of classifying each feature existing in a plurality of lower layer print attributes according to the exemplary embodiment of the present invention.

FIG. 11 illustrates an example of a method of classifying each Feature existing in a plurality of lower layer print attributes 1101*a*, 1101*b*, 1101*c*, and 1101*d*.

The lower layer print attribute comparison unit 901 classifies Features having a common Option in all lower layer print attributes 1101*a*, 1101*b*, 1101*c*, and 1101*d* extracted from the XPS document as a common Feature 1102. The lower layer print attribute elimination determination unit 902 classifies Features not having a common Option as a drawing data reflectible Feature 1103 or other Feature 1104. A specific example of the drawing data reflectible Feature 1103 will be described below with reference to FIG. 12.

The lower layer print attribute elimination determination unit 902 further classifies Features classified as other Feature 1104 as either an upper layer reflection Feature 1105 or a deletion Feature 1106. Such classification is performed based on contents that are preset (such as a list), or designation from a user using the user interface.

FIG. 12 illustrates an example of Features that can be reflected in the drawing data and features that cannot be reflected in the drawing data.

Referring to FIG. 12, the lower layer print attribute elimination determination unit 902 stores a function list 1200, which is referred to when classifying Features without a common Option as the drawing data reflectible Feature 1103 or the other Feature 1104.

The Features illustrated in FIG. 12 are defined by Microsoft Corporation as Public Feature. Each Feature and Option are described in "PrintTicket and PrintCapabilities Support in Windows Print Drivers." Features independently defined by a printing apparatus vendor can be included in the function list 1200 as Private Feature.

Examples of Features that can be reflected in the drawing data includes a poster printing Feature which changes the coordinates of each drawing object. A color setting Feature and an input color profile Feature that change the color of the drawing object or a stamp (watermark) Feature that adds a drawing object can be reflected in the drawing data. Designation of a paper feed position, or output quality of a printing apparatus that depends on the printing apparatus, cannot be reflected in the drawing data.

The lower layer print attribute elimination determination unit 902 classifies Features registered in the function list 1200 as Features that can be reflected in the drawing data, as the drawing data reflectible Feature 1103.

FIG. 13 illustrates an example of Features that can be set as the upper layer reflection Feature 1105.

Referring to FIG. 13, a function list 1300 is stored in the lower layer print attribute elimination determination unit 902, and is referred to when further classifying Features classified as the other Feature 1104 as the upper layer reflection Feature 1105 or the deletion Feature 1106.

In the present exemplary embodiment, Features such as a binding setting Feature and a collate setting Feature which, if deleted, change the printing format are mainly listed in the function list 1300. Features classified as the other Feature 1104 and included in the function list 1300 are classified as the upper layer reflection Feature 1105. Features classified as the other Feature 1104 and not included in the function list 1300 are classified as the deletion Feature 1106. Before classifying the other Feature 1104 as the deletion Feature 1106 according to the classification based on the function list 1300, it is useful to have the user confirm and correct the classification result as necessary via the user interface.

Figure 14:
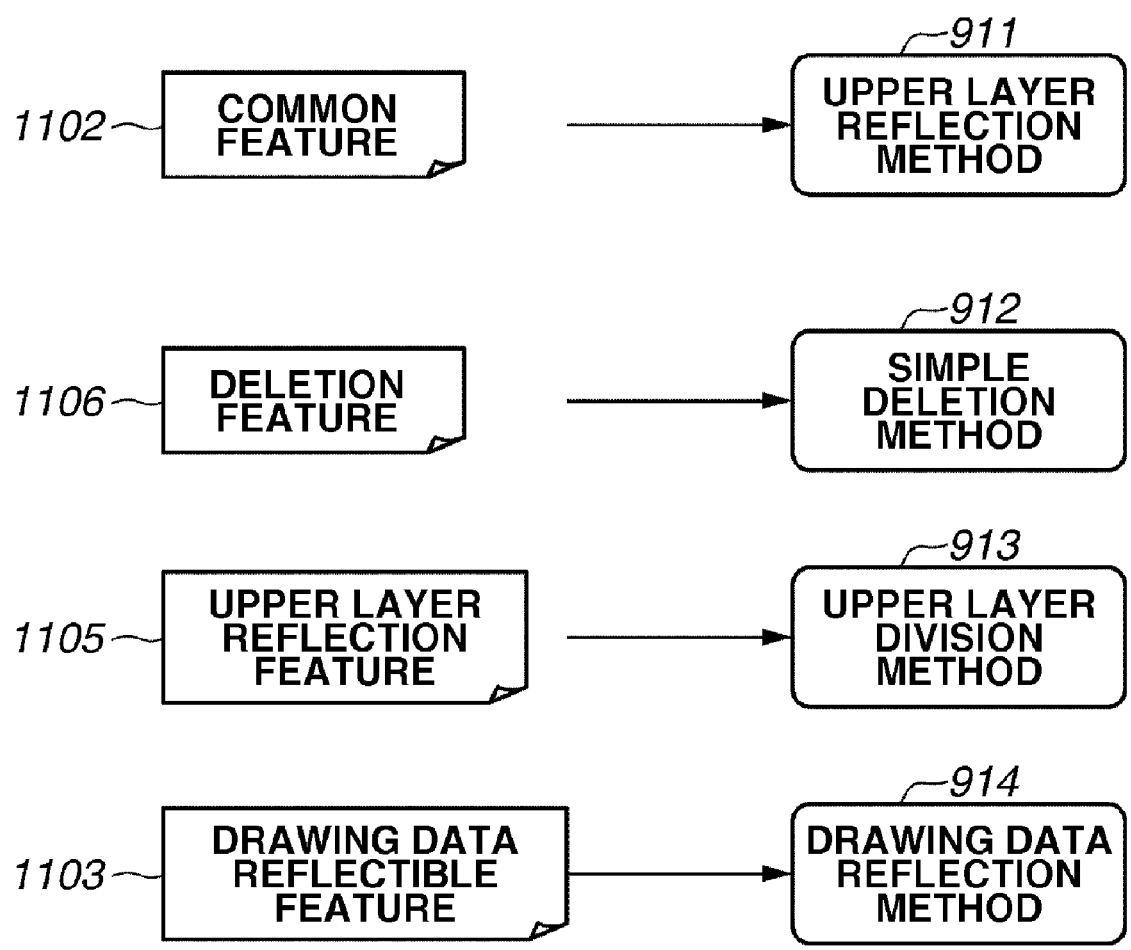
FIG. 14 illustrates an example of elimination methods for each classified feature according to the exemplary embodiment of the present invention.

FIG. 14 illustrates an example of an elimination method performed on each classified Feature. The elimination method is determined by the lower layer print attribute elimination determination unit 902.

Referring to FIG. 14, the upper layer reflection method 911, which directly reflects the Feature tag 1002 in the upper layer print attribute, is applied to the Feature classified as the common Feature 1102. The format of the XPS document is not affected at all, so that the method can be performed without any precondition. The simple deletion method 912, which simply deletes the Feature tag 1002 corresponding to the lower layer print attribute, is applied to a Feature classified as the deletion Feature 1106.

The upper layer division method 913 is applied to a Feature classified as the upper layer reflection Feature 1105, and the drawing data reflection method 914 is applied to the Feature classified as the drawing data reflectible Feature 1103. The upper layer division method 913 or the simple deletion method 912 can be applied to a Feature to which the drawing data reflection method 914 can be applied. The simple deletion method 912 can be applied to the Feature to which the upper layer division method 913 can be applied.

FIG. 15 illustrates an example of a general outline of the drawing data reflection method 914.

The drawing data reflection method 914 reflects, in the drawing data, the Feature that corresponds to the drawing data reflectible Feature 1103 in the lower layer print ticket. The lower layer Feature drawing data reflection unit 905 then deletes the Feature from the lower layer print ticket.

For example, FixedPage before print attribute conversion 1701 is a FixedPage without any drawing. PrintTicket before print attribute conversion 1702 associated with the FixedPage before print attribute conversion 1701 includes a Stamp Feature, which is a print attribute that displays or prints a word "confidential."

When the FixedPage before print attribute conversion 1701 and the PrintTicket before print attribute conversion 1702 are displayed by application software that considers print attributes, or printed by a printing apparatus that considers print attributes, a display/print result 1705 only describing "confidential" is acquired. If the Stamp Feature is classified as the drawing data reflectible Feature 1103, FixedPage after print attribute conversion 1703 is acquired by the drawing data reflection method 914.

Drawing tags such as <Glyphs>, </Glyphs> are added, and "confidential" is described as a drawing content in the FixedPage after print attribute conversion 1703. The Stamp Feature is deleted from the PrintTicket before print attribute conversion 1702, and PrintTicket after print attribute conversion 1704 is acquired. A display/output result 1706 of the FixedPage after print attribute conversion 1703 and the PrintTicket after print attribute conversion 1704, only describing "confidential," matches the display/print result 1705. As a result, the lower layer print attributes can be eliminated without changing the upper layer print attributes. However, Features which can reflect print attributes in the drawing data are limited, such as in the list illustrated in FIG. 12.

FIG. 16 illustrates an example of a detailed configuration of the lower layer Feature drawing data reflection unit 905.

Referring to FIG. 16, a drawing data reflection Feature acquisition unit 1801 receives the drawing data reflectible Feature 1103. A corresponding FixedPage acquisition unit 1802 then acquires a FixedPage associated with a lower layer print attribute in which the drawing data reflectible Feature 1103 is stored, and stores a drawing object. A drawing data reflection content determination unit 1803 identifies a drawing data processing method using the drawing data reflectible Feature 1103 and the function list 1200 illustrated in FIG. 12. A corresponding FixedPage updating unit 1804 then changes the drawing data (drawing object) of the FixedPage according to the drawing data processing method. The drawing data processing method includes, for example, processing colors of each drawing object according to the print attribute, processing coordinates of each drawing project according to the print attribute, and adding or changing the drawing object.

The drawing data processing method is different for each print attribute. If the drawing data reflectible Feature 1103 such as a zoom ratio setting is to be reflected in the drawing object, the corresponding FixedPage updating unit 1804 encloses the drawing object stored in the FixedPage using <Canvas>, </Canvas> tags. The corresponding FixedPage updating unit 1804 then designates the zoom ratio to the drawing object using <Transform>, </Transform> tags. If an input color profile is to be reflected in the drawing object as the drawing data reflectible Feature 1103, the corresponding FixedPage updating unit 1804 reflects an International Color Consortium (ICC) profile designated by the drawing data reflectible Feature 1103 in all drawing objects. A content of drawing data reflection method of print attributes is not limited to the above.

Figure 17:
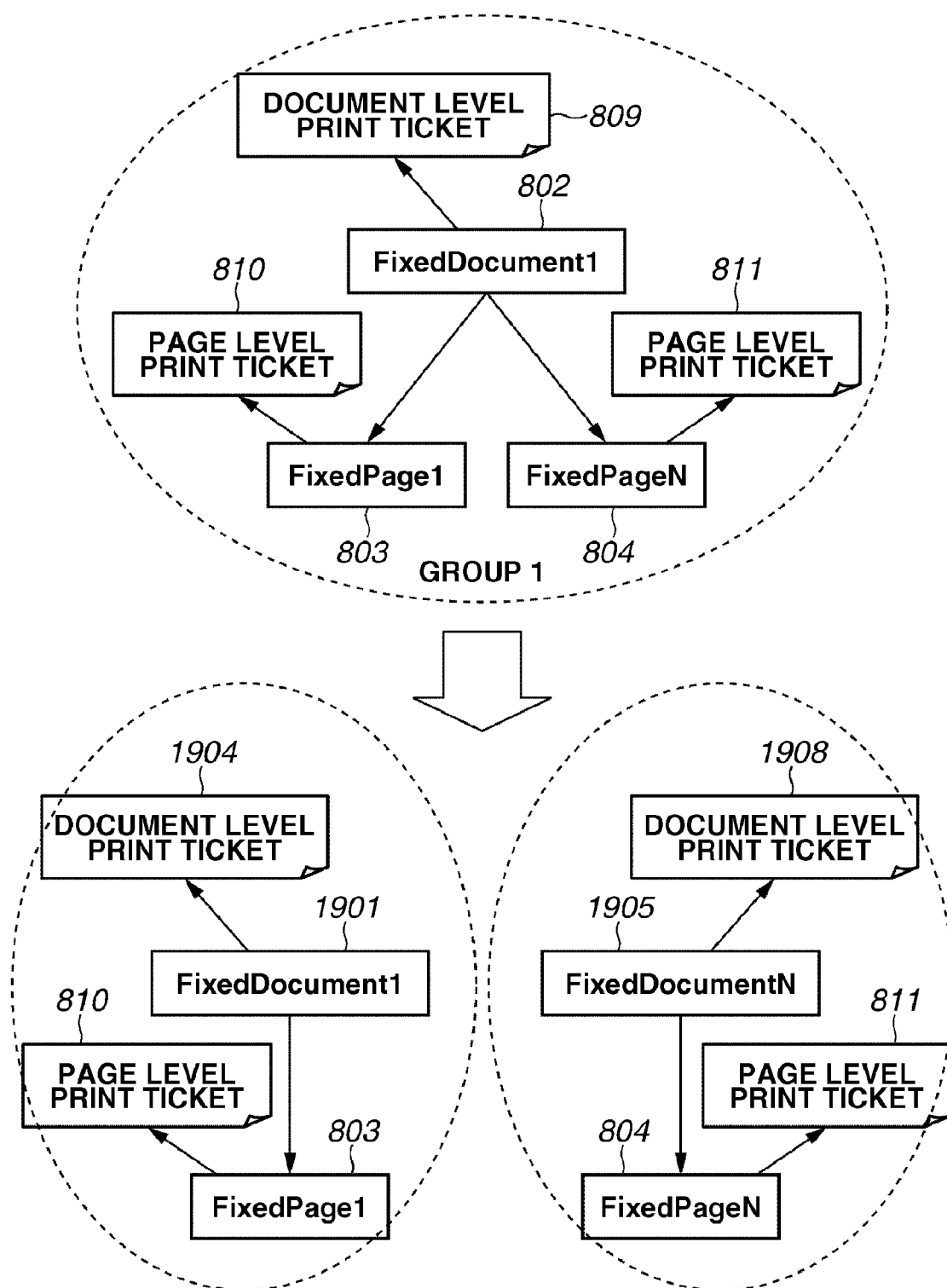
FIG. 17 illustrates an example of a general outline of an upper layer division method according to the exemplary embodiment of the present invention.

FIG. 17 is a schematic diagram illustrating an example of the upper layer division method 913. The upper layer division method 913 eliminates a Feature in the lower layer print ticket that corresponds to the upper layer reflection Feature 1105.

Referring to FIG. 17, group 1 is the two layers in group 1 illustrated in FIG. 8. In FIG. 17, Features exist in the page level print ticket 810 associated with the FixedPage 803 and the page level print ticket 811 associated with the FixedPage 804. A Feature that is neither the common Feature 1102, the deletion Feature 1106, nor the drawing data reflectible Feature 1103 is remaining among such Features. In such a case, an upper layer node that was originally a single node is divided, among nodes in the upper and lower layers of group 1.

For example, the upper layer division unit 904 generates a FixedDocument 1901 and a FixedDocument 1905 from the FixedDocument 802. The upper layer division unit 904 then separates the lower layer associated with the upper layer by structuring. The upper layer division unit 904 sets the FixedPage 803 as the lower layer of the FixedDocument 1901 and the FixedPage 804 as the lower layer of the FixedDocument 1905.

The lower layer Feature upper layer reflection unit 906 duplicates the document level print ticket 809 associated with the FixedDocument 802 before division, by a number of times the FixedDocument 802 is divided. The lower layer Feature upper layer reflection unit 906 then associates the duplicated document print tickets 1904 and 1908 with the FixedDocument 1901 and the Fixed Document 1905, respectively. The page level print tickets 810 and 811, FixedPage 803, and FixedPage 804, which are lower layer print attributes, are not changed.

In the above-described structure, a group formed of two layers including one upper layer and one or a plurality of lower layers is generated, and the lower layer print attributes in each group are deleted. The lower layer print attributes are deleted using either (repeating) the upper layer reflection method 911 using the common Feature 1102, or the upper layer division method 913. By repeating such division of the upper layer and regrouping, the lower layer print attributes can be deleted.

Figure 18:
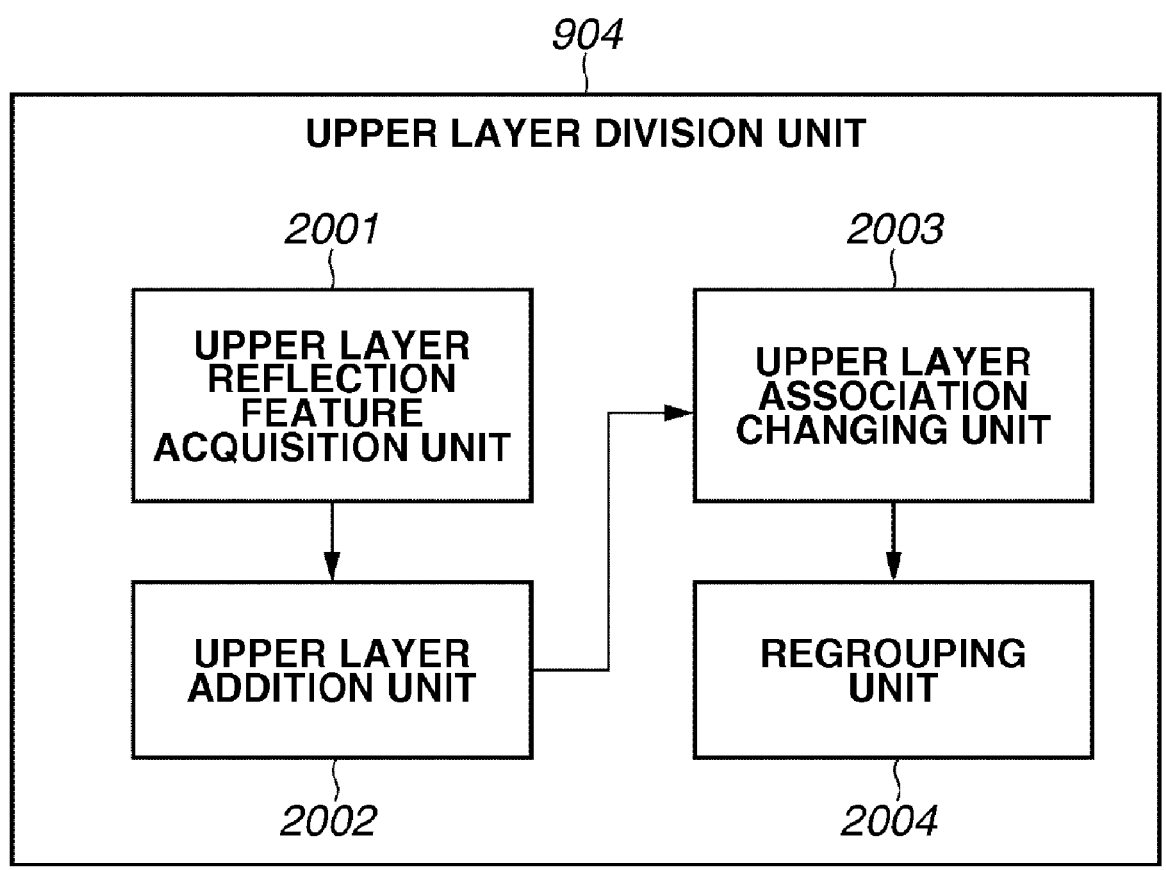
FIG. 18 illustrates an example of a detailed configuration of an upper layer division unit according to the exemplary embodiment of the present invention.

FIG. 18 illustrates a detailed configuration of the upper layer division unit 904.

Referring to FIG. 18, an upper layer reflection Feature acquisition unit 2001 acquires the upper layer reflection Feature 1105. As illustrated in FIG. 17, an upper layer addition unit 2002 divides the only node in the upper layer of the group. The upper layer addition unit 2002 duplicates the print attribute of the upper layer before division, by a number of times the upper layer is divided, and associates the duplicated print attributes with the divided upper layer node. The upper layer addition unit 2002 changes the association between the lower layer node including the print attribute, in which the upper layer reflection Feature 1105 exists, and the divided upper layer node.

An upper layer association changing unit 2003 associates a node outside the group associated with the upper layer node within the group, with all of the divided upper layer nodes. In the example illustrated in FIG. 17, the FixedDocumentSequence 801 is associated with the FixedDocument 802 before division (also refer to FIG. 8). Both the FixedDocument 1901 and the FixedDocument 1905 are associated with the FixedDocumentSequence 801 after the division. Since there are upper layers equal to the number of divisions within the group, a regrouping unit 2004 then generates a plurality of groups including one upper layer and one or more lower layers. By repeating elimination of the lower layer print attribute in each group, the lower layer print attributes are eliminated.

Figure 19:
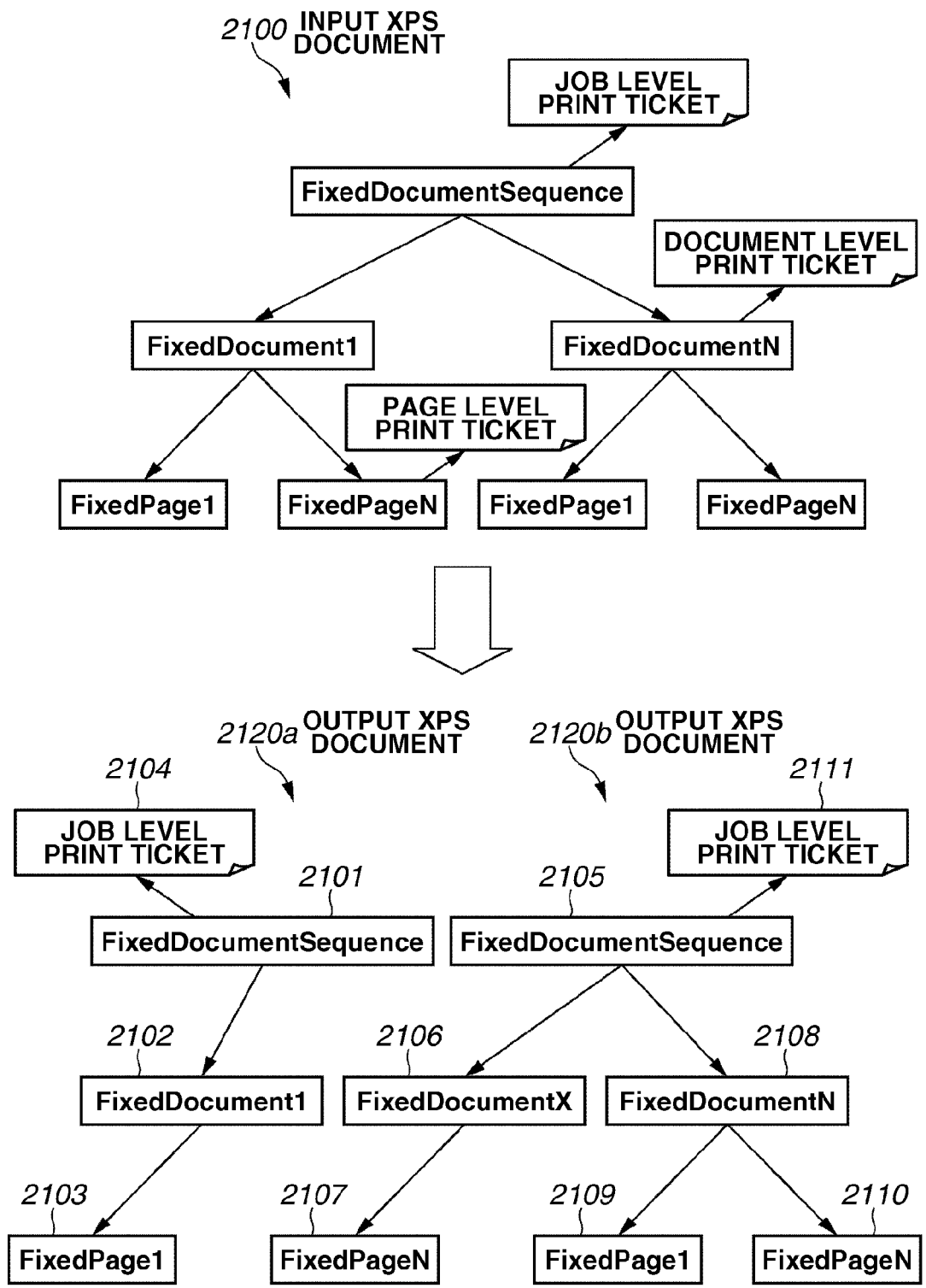
FIG. 19 illustrates an example of an input XPS document and an XPS document acquired by repeating the upper layer division method to the highest layer of the input XPS document according to the exemplary embodiment of the present invention.

FIG. 19 illustrates an example of an input XPS document and an XPS document acquired by repeating the upper layer division method 913 up to the highest layer of the input XPS document.

Referring to FIG. 19, there is one FixedDocumentSequence in an input XPS document 2100. The FixedDocumentSequence is then divided using the upper layer division method 913, and a plurality of XPS documents 2120a and 2120b equal to the number of division are generated. For example, a low-function printing apparatus can print the XPS documents 2120a and 2120b in order. An appropriate format can be acquired when the document is displayed by general application software that can only process a job level print ticket.

The plurality of documents 2120a and 2120b can be easily converted (merged) into one XPS document by associating the same job level print tickets with the plurality of documents 2120a and 2120b. In the example illustrated in FIG. 19, if job level print tickets 2104 and 2111 are the same, a FixedDocument 2106 and a FixedDocument 2108 associated with a FixedDocumentSequence 2105 can be associated with a FixedDocumentSequence 2101. The FixedDocumentSequence 2105 and the job level print ticket 2111 are then deleted. As describe above, editing of the job level print ticket 2104 can be easily set, and a content of the setting can be easily understood by the user, so that the job level print ticket 2104 can be edited using general application software.

Figure 20:
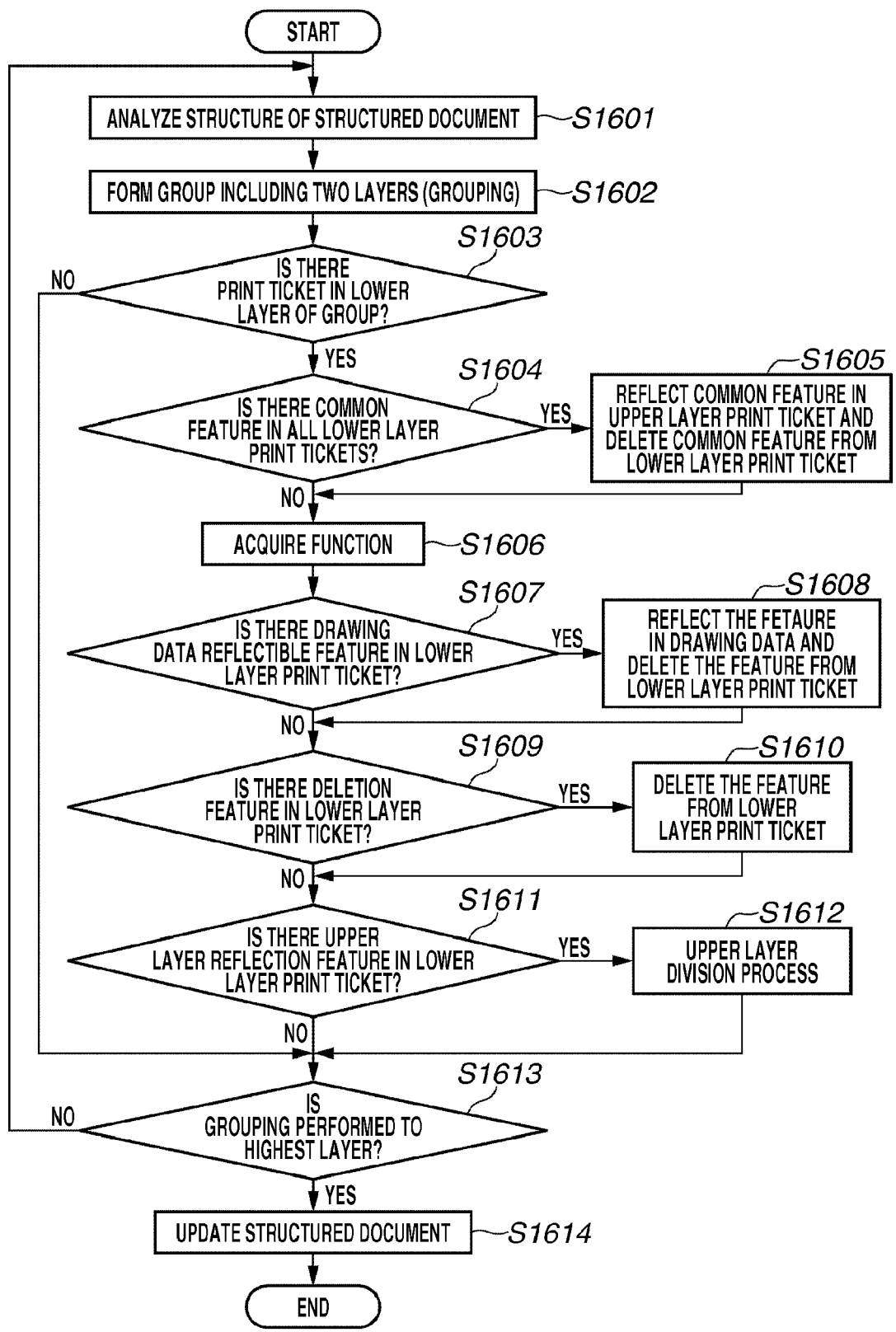
FIG. 20 is a flowchart illustrating an example of a print attribute conversion process according to the exemplary embodiment of the present invention.

FIG. 20 is a flowchart illustrating an example of a print attribute conversion process performed by the structured document conversion software 113.

In step S1601, when a structured document in which a print attribute can be added to each layer, such as an XPS document, is input, the XPS document acquisition/structure analysis unit 702 analyzes the structured document. The XPS document acquisition/structure analysis unit 702 then forms a tree structure illustrated in FIG. 8.

In step S1602, the two layer grouping unit 703 forms a group configured of an upper layer including one node and a lower layer including one or more nodes, sequentially from the lowest layer of the tree structure generated in step S1602.

In step S1603, the print attribute extraction unit 704 determines whether there is a print ticket (hierarchical layer print attribute) associated with the lower layer of the group formed in step S1602. If there is no print ticket (NO in step S1603), the process proceeds to step S1613. If there is a print ticket (YES in step S1603), the process proceeds to step S1604.

In step S1604, the lower layer print attribute comparison unit 901 analyzes all lower layer print tickets and determines whether there are the same Feature and Option in all print tickets. If there are the same Feature and Option in all print tickets (YES in step S1604), the process proceeds to step S1605. In step S1605, the lower layer print attribute elimination determination unit 902 reflects the common Feature (and Option) in the upper layer print ticket. The lower Feature deletion unit 903 then deletes the common Feature (and Option) from the lower layer print ticket. The process then proceeds to step S1606.

If it is determined that the same Feature and Option do not exist in all print tickets (NO in step S1604), the process skips step S1605 and proceeds to step S1606.

The Feature remaining in the lower layer print ticket is a Feature that does not exist in all lower layer print tickets. Therefore, in step S1606, the lower layer print attribute elimination determination unit 902 acquires the function lists 1200 and 1300 illustrated in FIGS. 12 and 13 to classify the Feature according to a characteristic of the Feature. The contents of the function lists 1200 and 1300 can be predetermined according to the characteristic of the Feature, or can be rewritten by a user.

In step S1607, the lower layer print attribute elimination determination unit 902 compares the Feature remaining in the lower layer print ticket with the acquired function list 1200 and determines whether there is the drawing data reflectible Feature 1103. If there is the drawing data reflectible Feature 1103 (YES in step S1607), the lower layer Feature drawing data reflection unit 905 reflects, in the drawing data, the Feature (and Option) that is the drawing data reflectible Feature 1103.

In step S1608, the lower layer Feature drawing data reflection unit 905 deletes the Feature (and Option) from the lower layer print ticket. The process then proceeds to step S1609.

If there is no drawing data reflectible Feature 1103 (NO in step S1607), the process skips step S1608 and proceeds to step S1609.

In step S1609, the lower layer print attribute elimination determination unit 902 compares the Feature remaining in the lower layer print ticket and the acquired function list 1200 and determines whether there is the deletion Feature 1106. If the lower layer print attribute elimination determination unit 902 determines that the deletion Feature exists (YES in step S1609), the process proceeds to step S1610. In step S1610, the lower Feature deletion unit 903 deletes the Feature (and Option) that corresponds to the deletion Feature 1106 from the lower layer print ticket. The process then proceeds to step S1611.

If the lower layer print attribute elimination determination unit 902 determines that the deletion Feature 1106 does not exist (NO in step S1609), the process skips step S1610 and proceeds to step S1611.

In step S1611, the lower layer print attribute elimination determination unit 902 compares the Feature remaining in the lower layer print ticket and the acquired function list 1300 and determines whether there is the upper layer reflection Feature 1105. If the lower layer print attribute elimination determination unit 902 determines that the upper layer reflection Feature 1105 exists (YES in step S1611), the process proceeds to step S1612.

In step S1612, the upper layer division process 904 performs the upper layer processing process. The lower layer Feature upper layer reflection unit 906 reflects the Feature (and Option) that corresponds to the upper layer reflection Feature 1105 in the divided upper layer print ticket. The lower layer Feature deletion unit 903 then deletes the Feature (and Option) that corresponds to the upper layer reflection Feature 1105 from the lower layer print ticket.

As a result, there is no Feature remaining in the lower layer print ticket, and the process performed by grouping two layers ends.

In step S1613, the highest layer print attribute XPS document conversion unit 706 determines whether the two layer grouping is performed up to the highest layer of the XPS document acquired in step S1601. More specifically, the highest layer print attribute XPS document conversion unit 706 determines whether there is no Feature (and Option) remaining in any of the print tickets, from the lowest layer to the layer subsequent to the highest layer (i.e., second highest layer). If the two layer grouping is not performed to the highest layer of the XPS document (NO in step S1613), the process returns to step 1602. A group is then formed from the lower portion of the layers in the tree structure created in step S1601, and the processes described in steps S1603 to S1613 are performed to the groups.

If the highest layer print attribute XPS document conversion unit 706 determines that the two layer grouping has been performed up to the highest layer of the XPS document (YES in step S1613), the process proceeds to step S1614. Since only one print attribute associated with the highest layer remains, the highest layer print attribute XPS document conversion unit 706 updates the XPS document 701 to the XPS document including the print attribute of the highest layer. The process illustrated in FIG. 20 then ends.

FIG. 21 illustrates an example of an elimination method editing approval screen displayed when confirming and correcting the elimination method performed on each Feature.

Referring to FIG. 21, an elimination method editing approval screen 1500 is displayed on the monitor 110 of the client apparatus 100*a* or 100*b* by a function of the lower layer print attribute elimination determination unit 902. The elimination method performed on each Feature is corrected and approved based on a user operation on the elimination method editing approval screen 1500 using a user interface.

In the example illustrated in FIG. 21, all Features to be eliminated from the lower layer print attribute are displayed, except for Features on which the upper layer reflection method 911 can be unconditionally performed. The drawing data reflection method 914 is indicated as "reflect in drawing data," the upper layer division method 913 as "structure change," and the simple deletion method 912 as "simple deletion."

The elimination method can be changed for each Feature by displaying a Feature name 1501 next to a deletion method 1502. In a changing dialog 1503 that corresponds to the Feature name 1501 "hole punching," "reflect in drawing data" is grayed out for the following reason. As described above, the simple deletion method 912 can be applied to a Feature to which the upper layer division method 913 can be applied. However, the drawing data reflection method 914 cannot be applied to such Feature.

According to the present exemplary embodiment, the feature name 1501 illustrated in FIG. 21 realizes an example of a content of a print attribute to be deleted, and the elimination method 1502 realizes an example of a method performed on the print attribute to be deleted. The deletion method selected using the changing dialog 1503 illustrated in FIG. 21 realizes an example of changes in the process performed on the print attribute to be deleted.

In the flowchart illustrated in FIG. 20, the Feature reflection and deletion can be performed after a user confirmation. The upper layer reflection method 911, the simple deletion method 912, the upper layer division method 913, or the drawing data reflection method 914 is selected to be performed instead of steps S1605, S1608, S1610, and S1612, according to the determination result of the preceding step. The elimination method editing approval screen 1500 is then displayed between steps S1613 and S1614, to receive a change in the elimination method 1502 instructed by the user. In step S1614, the Feature is reflected and deleted by the selected method, and the structured document is updated. If the change in the elimination method 1502 instructed by the user is received, the Feature is reflected and deleted using the received method instead of the selected method.

As described above, according to the present exemplary embodiment, a structured document is structured to provide document data to a plurality of nodes in a tree structure, and to associate print attributes with each of the plurality of nodes. In such a structured document, print attributes of relatively lower layer are reflected in other portions of the document. The lower layer print attribute is reflected in a print attribute of an upper layer node that is connected to the lower layer node by a branch. The lower layer print attribute is reflected in document data of the node associated with the print attribute.

The upper layer node is divided into a number corresponding to the number of lower layer nodes connected to the upper layer node by a branch, to reflect the print attributes. The print attribute associated with the original node is then associated with each of the divided plurality of nodes, and a lower layer node connected with the original node via a branch is connected to one of the plurality of nodes via a branch. The divided plurality of nodes is connected to a node of a layer that is higher than the layer connected to the original node via a branch.

By performing the above-described process, the print attribute of the lower layer is reflected in other portions, after which the lower layer print attribute is deleted. Further, the print attribute of the lower layer can be deleted. The process is performed until the print attribute is associated with only the highest layer. As a result, a structured document is acquired, in which the print attribute is associated with only the highest layer.

Therefore, the structured document becomes an ordinary document, so that the format when printing and displaying the document becomes independent of the user environment (application software and print attribute). When changing the print attribute to be used on another printer apparatus, the printer driver of the other printer apparatus can determine the print attributes added to the structured document. As a result, the print attribute can be changed to be appropriate for the other printing apparatus. If an electronic signature is to be added to the structured document by omitting print attributes that change with a change in the print setting, such print attributes that change with a change in the print setting can be searched. Therefore, a user-friendly structured document data can be provided to the user.

Each unit included in the printing apparatus and the document management apparatus and each step included in the print control method and the document management method according to the exemplary embodiments of the present invention can be realized by executing a program stored in a RAM or a ROM of a computer. The program and a storage medium that stores the program constitute the invention.

Further, the present invention can be in the form of a system, an apparatus, a method, a program, or a storage medium. More specifically, the present invention can be applied to a system configured of a plurality of devices, or an apparatus including one device.

The present invention can also be achieved by providing a storage medium which stores software (program code) for implementing functions of the above-described exemplary embodiments (for example, a program that corresponds to the flowchart illustrated in FIG. 20) to a system or an apparatus. The program code stored in the storage medium can be read and executed by a computer (a central processing unit (CPU) or a micro-processing unit (MPU)) of the system or the apparatus.

The software (program code) realizes the functions of the above-described exemplary embodiments. The software (program code) and the storage medium that stores the software (program code) constitute the present invention.

A computer executable program to implement the above-mentioned exemplary embodiments can take any form readable by a computer, for example, object code, a program executed by an interpreter, or script data to be supplied to an operating system (OS).

The storage medium can be a floppy disk, a hard disk, a magneto-optical disk, a compact disc-read-only memory (CD-ROM), a CD-recordable (CD-R), a CD-rewritable (CD-RW), a magnetic tape, a nonvolatile memory card, a ROM, or a digital versatile disc (DVD, DVD-ROM, and DVD-R).

Such software (program code) can also be supplied by accessing a web page on the Internet through the browser of a client computer. The software (program code) or a compressed file including an auto-install function can be downloaded from the web page onto a hard disk. The program code can be broken up into a plurality of files, and each file can be downloaded from different web pages. The present invention can be applied to a World Wide Web (WWW) server that allows numerous users to download the program files so that the functions or processes of the present invention can be realized on their computers.

Furthermore, such software (program code) can be encrypted and stored in a storage medium, such as a CD-ROM, to be distributed to users. A user who meets given conditions can download the key information for decrypting the program from a web page through the Internet. By using the key information, the encrypted program can be executed and installed in a computer to realize the functions of the present invention.

Furthermore, the above-described exemplary embodiments can be realized by executing software (program code) read by a CPU. However, an operating system (OS) or the like working on a computer can also perform a part or the whole of processes according to instructions of the software (program code) and realize functions of the above-described exemplary embodiments.

Furthermore, software (program code) read from a storage medium can be stored in a memory equipped in a function expansion board inserted in a computer or a function expansion unit connected to a computer, and a CPU in the function expansion board or the function expansion unit can execute all or a part of the processing according to the instructions of the software (program code) to realize the functions of the above-described exemplary embodiments.

According to an exemplary embodiment of the present invention, structured document data in which print attributes are associated with only the highest layer of the tree structure is generated. As a result, structured document data that is easier for the user to use compared to conventional structured document data can be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-111771 filed Apr. 22, 2008, which is hereby incorporated by reference herein in its entirety.

What is claimed is:

1. A structured document conversion apparatus configured to convert structured document data that contains document data in a plurality of nodes in a tree structure and can associate a print attribute with each of the plurality of nodes, the apparatus comprising:
a deletion unit configured to determine whether a print attribute associated with a node of a lower hierarchical layer than a top layer in the tree structure is a print attribute capable of being reflected to document data contained in the node of the lower hierarchical layer, and in a case where the print attribute associated with a node of the lower hierarchical layer is determined as capable of being reflected to the document data contained in the node of the lower hierarchical layer, reflect the print attribute associated with the node of the lower hierarchical layer to the document data contained in the node of the lower hierarchical layer and delete the print attribute associated with the node of the lower hierarchical layer,
wherein the structured document conversion apparatus generates structured document data in which the print attribute is associated with the highest hierarchical layer in the tree structure.

2. The structured document conversion apparatus according to claim 1, wherein the reflection unit reflects the print attribute associated with the node of the lower hierarchical layer in one of a print attribute associated with a node positioned higher than the node of the lower hierarchical layer and drawing data of the node of the lower hierarchical layer.

3. The structured document conversion apparatus according to claim 1, wherein the deletion unit deletes, according to the content of the print attribute associated with the node of the hierarchical layer lower than the highest hierarchical layer in the tree structure, the print attribute.

4. The structured document conversion apparatus according to claim 1, further comprising:
a division unit configured to divide a node positioned higher than the node of the lower hierarchical layer into a plurality of nodes;
an association unit configured to associate a print attribute associated with the node before being divided with each of the plurality of nodes obtained by the division unit; and
a setting unit configured to set the node of the lower hierarchical layer to a position lower than one of the plurality of nodes obtained by the division unit.

5. The structured document conversion apparatus according to claim 4, further comprising:
a merging unit configured to merge, when the division unit divides the highest hierarchical layer node so that the structured document data becomes a plurality of pieces of structured document data, at least two of the plurality of pieces of structured document data.

6. The structured document conversion apparatus according to claim 1, further comprising:
a grouping unit configured to group the structured document data into a group including two hierarchical layers in the tree structure,
wherein the reflection unit reflects a print attribute associated with a node of a hierarchical layer that is lower among the two hierarchical layers in the group, in other portions of the group.

7. The structured document conversion apparatus according to claim 6, wherein the grouping unit groups the structured document data into a group including a highest hierarchical layer node in the group, one or more nodes positioned lower than the highest hierarchical node, and print attributes associated with the nodes.

8. The structured document conversion apparatus according to claim 1, wherein the reflection unit reflects, in the other portions of the tree structure, print attributes associated with nodes of each hierarchical layer sequentially from a lowest hierarchical layer to a second highest hierarchical layer in the tree structure.

9. The structured document conversion apparatus according to claim 1, further comprising:
a notification unit configured to notify the content of a print attribute to be deleted by the deletion unit and a method of processing the print attribute; and
a receiving unit configured to receive changes in a method of processing the print attribute received from the notification unit based on a user operation,
wherein the reflection unit and the deletion unit process the print attribute according to the changes received by the receiving unit.

10. A structured document conversion method for converting structured document data that contains document data in a plurality of nodes in a tree structure and can associate a print attribute with each of the plurality of nodes, the structured document conversion method comprising:
determining whether a print attribute associated with a node of a lower hierarchical layer than a top layer in the tree structure is a print attribute capable of being reflected to document data contained in the node of the lower hierarchical layer, and in a case where the print attribute associated with a node of the lower hierarchical layer is determined as capable of being reflected to the document data contained in the node of the lower hierarchical layer, reflect the print attribute associated with the node of the lower hierarchical layer to the document data contained in the node of the lower hierarchical layer and delete the print attribute associated with the node of the lower hierarchical layer, wherein the structured document conversion method generates structured document data in which the print attribute is associated with the highest hierarchical layer in the tree structure.

11. A non-transitory computer-readable storage medium storing a computer program for causing a computer to execute a method for converting structured document data that contains document data in a plurality of nodes in a tree structure and can associate a print attribute with each of the plurality of nodes, the method comprising:
    determining whether a print attribute associated with a node of a lower hierarchical layer than a top layer in the tree structure is a print attribute capable of being reflected to document data contained in the node of the lower hierarchical layer, and in a case where the print attribute associated with a node of the lower hierarchical layer is determined as capable of being reflected to the document data contained in the node of the lower hierarchical layer, reflect the print attribute associated with the node of the lower hierarchical layer to the document data contained in the node of the lower hierarchical layer and delete the print attribute associated with the node of the lower hierarchical layer,
    wherein the method generates structured document data in which the print attribute is associated with the highest hierarchical layer in the tree structure.

12. A structured document conversion apparatus configured to convert structured document data that contains document data in a plurality of nodes in a tree structure and can associate a print attribute with each of the plurality of nodes, the structured document conversion apparatus comprising:
    a deletion unit configured to determine whether a print attribute associated with a node of a lower hierarchical layer than a top layer in the tree structure is a print attribute capable of being reflected to document data contained in the node of the lower hierarchical layer, and in a case where the print attribute associated with a node of the lower hierarchical layer is determined as capable of being reflected to the document data contained in the node of the lower hierarchical layer, reflect the print attribute associated with the node of the lower hierarchical layer to the document data contained in the node of the lower hierarchical layer and delete the print attribute associated with the node of the lower hierarchical layer,
    wherein the structured document conversion apparatus generates structured document data in which the print attribute is not associated with any hierarchical layer other than the highest hierarchical layer in the tree structure.

13. A structured document conversion method for converting structured document data that contains document data in a plurality of nodes in a tree structure and can associate a print attribute with each of the plurality of nodes, the structured document conversion method comprising:
    determining whether a print attribute associated with a node of a lower hierarchical layer than a top layer in the tree structure is a print attribute capable of being reflected to document data contained in the node of the lower hierarchical layer, and in a case where the print attribute associated with a node of the lower hierarchical layer is determined as capable of being reflected to the document data contained in the node of the lower hierarchical layer, reflect the print attribute associated with the node of the lower hierarchical layer to the document data contained in the node of the lower hierarchical layer and delete the print attribute associated with the node of the lower hierarchical layer,
    wherein the structured document conversion method generates structured document data in which the print attribute is not associated with any hierarchical layer other than the highest hierarchical layer in the tree structure.

14. A non-transitory computer-readable storage medium storing a computer program for causing a computer to execute a method for converting structured document data that contains document data in a plurality of nodes in a tree structure and can associate a print attribute with each of the plurality of nodes, the method comprising:
    determining whether a print attribute associated with a node of a lower hierarchical layer than a top layer in the three structure is a print attribute capable of being reflected to document data contained in the node of the lower hierarchical layer, and in a case where the print attribute associated with a nod of the lower hierarchical layer is determined as capable of being reflected to the document data contained in the node of the lower hierarchical layer, reflect the print attribute associated with the node of the lower hierarchical layer to the document data contained in the node of the lower hierarchical layer and delete the print attribute associated with the node of the lower hierarchical layer,
    wherein the method generates structured document data in which the print attribute is not associated with any hierarchical layer other than the highest hierarchical layer in the tree structure.

15. A structured document conversion apparatus configured to convert structured document data that contains document data in a plurality of nodes in a tree structure and can associate a print attribute with each of the plurality of nodes, the apparatus comprising:
    a deletion unit configured to determine whether a print attribute associated with a node of a lower hierarchical layer than a top layer in the three structure is a print attribute capable of being reflected to document data contained in the node of the lower hierarchical layer, and in a case where the print attribute associated with a nod of the lower hierarchical layer is determined as capable of being reflected to the document data contained in the node of the lower hierarchical layer, reflect the print attribute associated with the node of the lower hierarchical layer to the document data contained in the node of the lower hierarchical layer and delete the print attribute associated with the node of the lower hierarchical layer,
    wherein the structured document conversion apparatus generates structured document data in which the print attribute is not associated with any hierarchical layer other than the highest hierarchical layer in the tree structure.

* * * * *